(12) United States Patent
Ke et al.

(10) Patent No.: US 11,668,898 B2
(45) Date of Patent: Jun. 6, 2023

(54) IMAGE LENS ASSEMBLY, IMAGE CAPTURING UNIT AND ELECTRONIC DEVICE

(71) Applicant: LARGAN PRECISION CO., LTD., Taichung (TW)

(72) Inventors: Yu-Chun Ke, Taichung (TW); Jin Sen Wang, Taichung (TW); Ssu-Hsin Liu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 313 days.

(21) Appl. No.: 17/020,590

(22) Filed: Sep. 14, 2020

(65) Prior Publication Data
US 2022/0035131 A1 Feb. 3, 2022

(30) Foreign Application Priority Data
Jul. 30, 2020 (TW) .................................. 109125825

(51) Int. Cl.
| G02B 9/60 | (2006.01) |
| G02B 13/00 | (2006.01) |
| G02B 13/02 | (2006.01) |
| G02B 27/00 | (2006.01) |
| G02B 13/18 | (2006.01) |

(52) U.S. Cl.
CPC ........... *G02B 9/60* (2013.01); *G02B 13/0045* (2013.01); *G02B 13/02* (2013.01); *G02B 27/0025* (2013.01)

(58) Field of Classification Search
None
See application file for complete search history.

(56) References Cited

U.S. PATENT DOCUMENTS

| 8,780,459 B2 | 7/2014 | Chen et al. |
| 9,091,801 B2 | 7/2015 | Huang |
| 9,191,561 B2 | 11/2015 | Lin et al. |

(Continued)

FOREIGN PATENT DOCUMENTS

| CN | 103777325 A | 5/2014 |
| CN | 106405796 A | 2/2017 |

(Continued)

OTHER PUBLICATIONS

Office Action in Taiwan application 109125825 dated Nov. 26, 2020.

*Primary Examiner* — Darryl J Collins
(74) *Attorney, Agent, or Firm* — Maschoff Brennan

(57) ABSTRACT

An image lens assembly includes five lens elements which are, in order from an object side to an image side along an optical path: a first lens element, a second lens element, a third lens element, a fourth lens element and a fifth lens element. The first lens element has positive refractive power. The second lens element with positive refractive power has an image-side surface being convex in a paraxial region thereof. The fourth lens element with positive refractive power has an object-side surface being convex in a paraxial region thereof and having at least one concave critical point in an off-axis region thereof. The fifth lens element has an image-side surface being concave in a paraxial region thereof and having at least one convex critical point in an off-axis region thereof.

26 Claims, 31 Drawing Sheets

(56) References Cited

U.S. PATENT DOCUMENTS

| | | | |
|---|---|---|---|
| 9,482,849 B2 | 11/2016 | Tsai et al. | |
| 10,185,125 B2 | 1/2019 | Lin et al. | |
| 10,571,660 B2 | 2/2020 | Hsu et al. | |
| 2015/0097106 A1 | 4/2015 | Yu | |
| 2015/0103243 A1 | 4/2015 | Lin et al. | |
| 2016/0097917 A1 | 4/2016 | Liao et al. | |
| 2016/0097918 A1 | 4/2016 | Liao et al. | |
| 2016/0103298 A1 | 4/2016 | Liao et al. | |
| 2016/0195693 A1 | 7/2016 | Tang et al. | |
| 2016/0195696 A1 | 7/2016 | Tang et al. | |
| 2016/0349489 A1 | 12/2016 | Dai et al. | |
| 2016/0356990 A1 | 12/2016 | Liu et al. | |
| 2016/0356991 A1 | 12/2016 | Liu et al. | |
| 2018/0180849 A2 | 6/2018 | Dai et al. | |
| 2018/0180854 A1* | 6/2018 | Huh | G02B 13/0045 |
| 2018/0188491 A1 | 7/2018 | Chang et al. | |
| 2018/0188492 A1 | 7/2018 | Chang et al. | |
| 2020/0319430 A1* | 10/2020 | Hosono | G02B 13/0045 |
| 2020/0333562 A1 | 10/2020 | Lin et al. | |
| 2020/0409050 A1* | 12/2020 | Chen | G02B 13/0045 |

FOREIGN PATENT DOCUMENTS

| | | |
|---|---|---|
| CN | 107065128 A | 8/2017 |
| CN | 107121755 A | 9/2017 |
| CN | 110262014 A | 9/2019 |
| CN | 110275278 A | 9/2019 |
| JP | 2009-294528 A | 12/2009 |
| JP | 2010-145648 A | 7/2010 |
| TW | I683149 B | 1/2020 |
| TW | I687730 B | 3/2020 |

\* cited by examiner

IMAGE LENS ASSEMBLY, IMAGE CAPTURING UNIT AND ELECTRONIC DEVICE

RELATED APPLICATIONS

This application claims priority to Taiwan Application 109125825, filed on Jul. 30, 2020, which is incorporated by reference herein in its entirety.

BACKGROUND

Technical Field

The present disclosure relates to an image lens assembly, an image capturing unit and an electronic device, more particularly to an image lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an image lens assembly includes five lens elements. The five lens elements are, in order from an object side to an image side along an optical path, a first lens element, a second lens element, a third lens element, a fourth lens element and a fifth lens element.

The first lens element has positive refractive power. The second lens element with positive refractive power has an image-side surface being convex in a paraxial region thereof. The fourth lens element with positive refractive power has an object-side surface being convex in a paraxial region thereof and having at least one concave critical point in an off-axis region thereof. The fifth lens element has an image-side surface being concave in a paraxial region thereof and having at least one convex critical point in an off-axis region thereof.

When an Abbe number of the third lens element is V3, an Abbe number of the fourth lens element is V4, a curvature radius of an object-side surface of the second lens element is R3, a curvature radius of the image-side surface of the second lens element is R4, a curvature radius of an object-side surface of the fifth lens element is R9, and a curvature radius of the image-side surface of the fifth lens element is R10, the following conditions are satisfied:

$V3+V4<70;$ $0.50<(R3+R4)/(R3-R4);$ and $0<(R9+R10)/(R9-R10).$

According to another aspect of the present disclosure, an image lens assembly includes five lens elements. The five lens elements are, in order from an object side to an image side along an optical path, a first lens element, a second lens element, a third lens element, a fourth lens element and a fifth lens element.

The first lens element has positive refractive power. The second lens element has positive refractive power. The fourth lens element with positive refractive power has an object-side surface being convex in a paraxial region thereof and having at least one concave critical point in an off-axis region thereof. The fifth lens element with negative refractive power has an object-side surface being convex in a paraxial region thereof and an image-side surface being concave in a paraxial region thereof. The image-side surface of the fifth lens element has at least one convex critical point in an off-axis region thereof.

When an Abbe number of the third lens element is V3, an Abbe number of the fourth lens element is V4, a curvature radius of the object-side surface of the fourth lens element is R7, a curvature radius of an image-side surface of the fourth lens element is R8, and half of a maximum field of view of the image lens assembly is HFOV, the following conditions are satisfied:

$V3+V4<70;$ $1.0<|R8/R7|;$ and $0.90<\tan(HFOV).$

According to another aspect of the present disclosure, an image capturing unit includes one of the aforementioned image lens assemblies and an image sensor, wherein the image sensor is disposed on an image surface of the image lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An image lens assembly includes five lens elements. The five lens elements are, in order from an object side to an image side along an optical path, a first lens element, a second lens element, a third lens element, a fourth lens element and a fifth lens element.

The first lens element has positive refractive power. Therefore, it is favorable for gathering light rays at wide field of view in the image lens assembly.

The second lens element has positive refractive power. Therefore, it is favorable for distributing significant positive refractive power of the image lens assembly to the first and second lens elements, and light can be gathered on the image surface by the positive second lens element. The second lens element can have an image-side surface being convex in a paraxial region thereof. Therefore, it is favorable for adjusting the light path so that the total track length of the image lens assembly can be properly controlled.

The third lens element can have negative refractive power. Therefore, it is favorable for correcting aberrations caused by the miniaturization of the image lens assembly.

Figure 31:
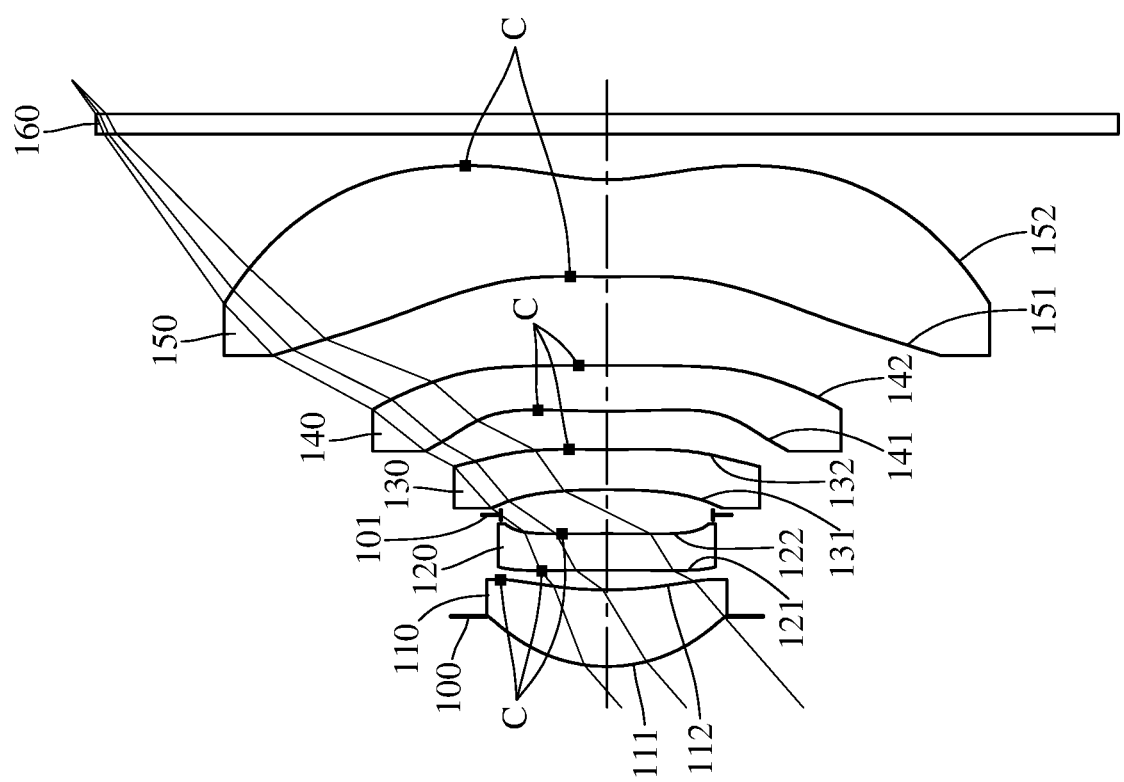
FIG. 31 shows a schematic view of critical points of the lens elements according to the 1st embodiment of the present disclosure.

The fourth lens element with positive refractive power has an object-side surface being convex in a paraxial region thereof and having at least one concave critical point in an off-axis region thereof. Therefore, it is favorable for providing the peripheral light converging capability and reducing the total track length of the image lens assembly so as to achieve compactness. The fourth lens element can have an image-side surface being concave in a paraxial region thereof and having at least one convex critical point in an off-axis region thereof. Therefore, it is favorable for reducing aberrations and correcting off-axis field curvature. Please refer to FIG. 31, which shows a schematic view of critical points C on some lens surfaces of the first lens element 110, the second lens element 120, the third lens element 130, the fourth lens element 140 and the fifth lens element 150 according to the 1st embodiment of the present disclosure. The critical points of the first lens element, the second lens element, the third lens element, the fourth lens element and the fifth lens element in FIG. 31 are only exemplary. In other embodiments, each of object-side surfaces and image-side surfaces of the lens elements can have one or more critical points.

The fifth lens element can have negative refractive power. Therefore, it is favorable for adjusting the Petzval sum so as to correct astigmatism and field curvature. The fifth lens element can have an object-side surface being convex in a paraxial region thereof. Therefore, it is favorable for correcting aberrations to improve image quality. The fifth lens element has an image-side surface being concave in a paraxial region thereof and having at least one convex critical point in an off-axis region thereof. Therefore, it is favorable for moving a principal point toward the object side and further correcting off-axis aberrations.

When an Abbe number of the third lens element is V3, and an Abbe number of the fourth lens element is V4, the following condition is satisfied: $V3+V4<70$. Therefore, it is favorable for correcting chromatic aberration without over-corrections. Moreover, the following condition can also be satisfied: $20<V3+V4<60$.

When a curvature radius of an object-side surface of the second lens element is R3, and a curvature radius of the image-side surface of the second lens element is R4, the following condition can be satisfied: $0.50<(R3+R4)/(R3-R4)$. Therefore, it is favorable for the second lens element to have a proper shape configuration for eliminating aberrations generated by the first lens element so as to improve image quality. Moreover, the following condition can also be satisfied: $0.50<(R3+R4)/(R3-R4)<2.50$. Moreover, the following condition can also be satisfied: $0.60<(R3+R4)/(R3-R4)<2.0$.

When a curvature radius of the object-side surface of the fifth lens element is R9, and a curvature radius of the image-side surface of the fifth lens element is R10, the following condition can be satisfied: $0<(R9+R10)/(R9-R10)$. Therefore, it is favorable for the fifth lens element to have relatively even surface change so as to prevent excessive thickness differences and thus prevent manufacturing problems. Moreover, the following condition can also be satisfied: $0.50<(R9+R10)/(R9-R10)<7.50$.

When a curvature radius of the object-side surface of the fourth lens element is R7, and a curvature radius of the image-side surface of the fourth lens element is R8, the following condition can be satisfied: $0.50<|R8/R7|$. Therefore, it is favorable for the fourth lens element to have a surface shape capable of providing sufficient refractive power so as to enhance the aberration correction capability of the fourth lens element. Moreover, the following condition can also be satisfied: $1.0<|R8/R7|$.

When half of a maximum field of view of the image lens assembly is HFOV, the following condition can be satisfied: $0.90<\tan(HFOV)$. Therefore, it is favorable for obtaining a configuration of compactness and wide field of view for various applications. Moreover, the following condition can also be satisfied: $0.95<\tan(HFOV)<2.0$.

When the maximum field of view of the image lens assembly is FOV, the following condition can be satisfied: 85 degrees<FOV<120 degrees. Therefore, it is favorable for achieving a wide-field-of-view configuration and also preventing distortion caused by an overly wide field of view. Moreover, the following condition can also be satisfied: 90 degrees<FOV<110 degrees.

When a maximum image height of the image lens assembly (which can be half of a diagonal length of an effective photosensitive area of an image sensor) is ImgH, and an axial distance between the image-side surface of the fifth lens element and an image surface is BL, the following condition can be satisfied: $2.5<ImgH/BL$. Therefore, it is favorable for adjusting the image dimensions and the back focal length so as to have a desired incident angle of light on the image surface, thereby improving the response efficiency of the image sensor. Moreover, the following condition can also be satisfied: $2.5<ImgH/BL<5.0$.

When a curvature radius of an image-side surface of the first lens element is R2, and the curvature radius of the object-side surface of the second lens element is R3, the following condition can be satisfied: $-1.0<R2/R3$. Therefore, it is favorable for the second lens element to have a shape configuration for correcting aberrations generated by the first lens element so as to improve image quality.

When a focal length of the second lens element is f2, and a focal length of the third lens element is f3, the following condition can be satisfied: $|f3/f2|<1.0$. Therefore, it is favorable for the third lens element to have sufficient refractive power so as to enhance the aberration correction capability. Moreover, the following condition can also be satisfied: $|f3/f2|<0.8$.

When a focal length of the image lens assembly is f, and a curvature radius of an object-side surface of the third lens element is R5, the following condition can be satisfied: $f/R5<-0.60$. Therefore, it is favorable for the third lens element to have a shape configuration collaborated with the shape of the image-side surface of the second lens element so as to further improve space utilization. Moreover, the following condition can also be satisfied: $-6.0<f/R5<-1.50$.

When an axial distance between an object-side surface of the first lens element and the image-side surface of the fifth lens element is Td, and an entrance pupil diameter of the image lens assembly is EPD, the following condition can be satisfied: $1.50<Td/EPD<2.75$. Therefore, it is favorable for obtaining a configuration of compactness and wide field of view for various applications.

When a focal length of the first lens element is f1, and the focal length of the second lens element is f2, the following condition can be satisfied: $0.30<f1/f2<2.0$. Therefore, it is favorable for preventing the first lens element from having overly strong refractive power and thus preventing the field of view from being narrowing down, thereby achieving a wide field of view configuration. Moreover, the following condition can also be satisfied: $0.50<f1/f2<1.75$.

When an Abbe number of the first lens element is V1, an Abbe number of the second lens element is V2, the Abbe number of the third lens element is V3, the Abbe number of the fourth lens element is V4, an Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, and a refractive index of the i-th lens element is Ni, at least one lens element of the image lens assembly can satisfy the following condition: $7.5<Vi/Ni<12.0$, wherein i=1, 2, 3, 4 or 5. Therefore, a proper selection of materials of the lens elements is favorable for correcting chromatic aberration.

When a curvature radius of the object-side surface of the first lens element is R1, and the curvature radius of the image-side surface of the second lens element is R4, the following condition can be satisfied: $-0.50<(R1+R4)/(R1-R4)<0.50$. Therefore, it is favorable for preventing the image-side surface of the second lens element from being overly flat and thus ensuring that the lens element has sufficient refractive power at off-axis region, thereby able to gather light at large field of view onto the image surface.

When the focal length of the image lens assembly is f, a focal length of the fourth lens element is f4, and a focal length of the fifth lens element is f5, the following condition can be satisfied: $1.0<(f/f4)-(f/f5)$. Therefore, it is favorable for arranging the refractive power of the fourth lens element and the fifth lens element so as to enhance the off-axis aberration correction capability thereof and reduce the back focal length to achieve compactness. Moreover, the following condition can also be satisfied: $1.10<(f/f4)-(f/f5)<3.50$.

When a minimum value among the Abbe numbers of all lens elements of the image lens assembly is Vmin, the following condition can be satisfied: $Vmin<20$. Therefore, it is favorable for balancing the capability of converging light rays with different wavelengths so as to correct chromatic aberration.

When the curvature radius of the object-side surface of the fourth lens element is R7, and the curvature radius of the image-side surface of the fourth lens element is R8, the following condition can be satisfied: $(R7+R8)/(R7-R8)<1.5$. Therefore, it is favorable for the shape configuration of the fourth lens element so as to have sufficient refractive power for correcting aberrations. Moreover, the following condition can also be satisfied: $-2.0<(R7+R8)/(R7-R8)<0.5$.

According to the present disclosure, the aforementioned features and conditions can be utilized in numerous combinations so as to achieve corresponding effects.

According to the present disclosure, the lens elements of the image lens assembly can be made of either glass or plastic material. When the lens elements are made of glass material, the refractive power distribution of the image lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the image lens assembly, based on the corresponding image sensor, can be flat or curved, especially a curved surface being concave facing towards the object side of the image lens assembly.

According to the present disclosure, an image correction unit, such as a field flattener, can be optionally disposed between the lens element closest to the image side of the image lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 28:
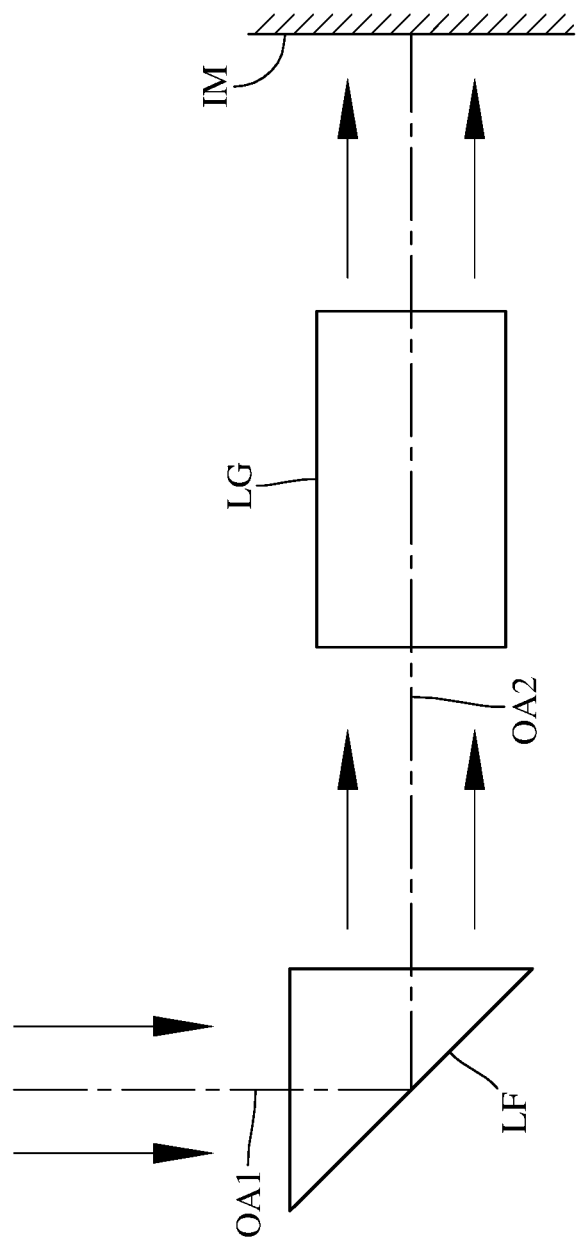
FIG. 28 shows a schematic view of a configuration of a light-folding element in an image lens assembly according to one embodiment of the present disclosure.
Figure 29:
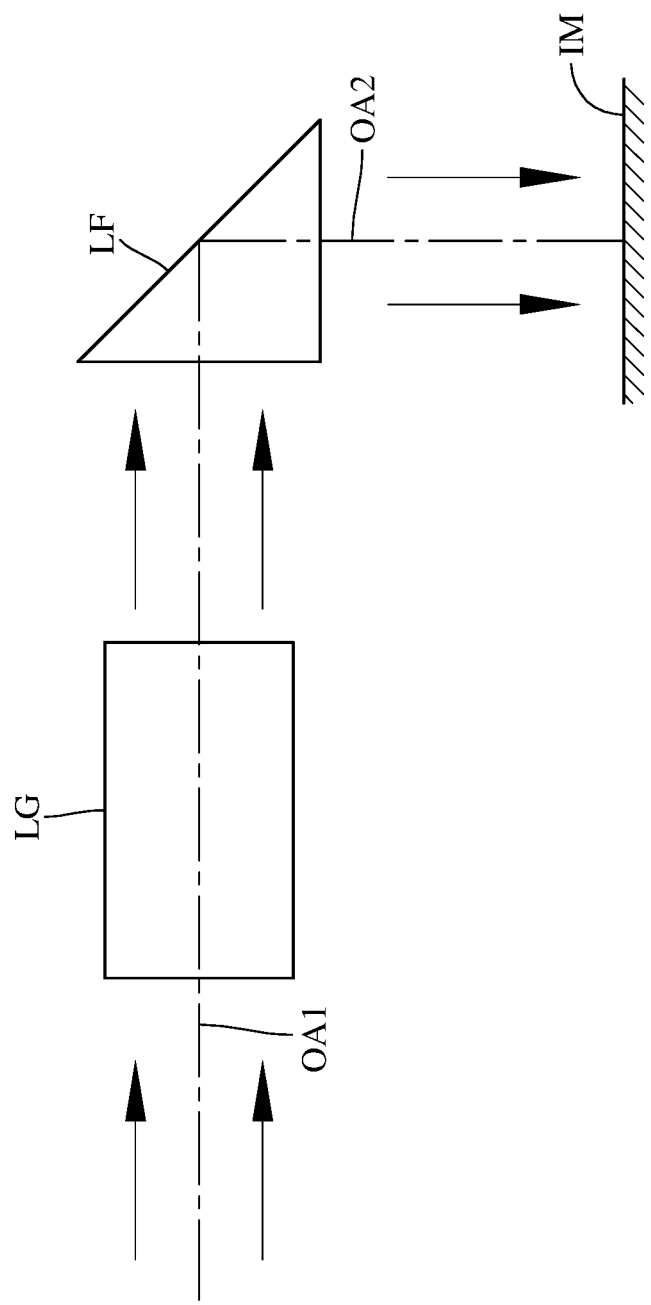
FIG. 29 shows a schematic view of another configuration of a light-folding element in an image lens assembly according to one embodiment of the present disclosure.
Figure 30:
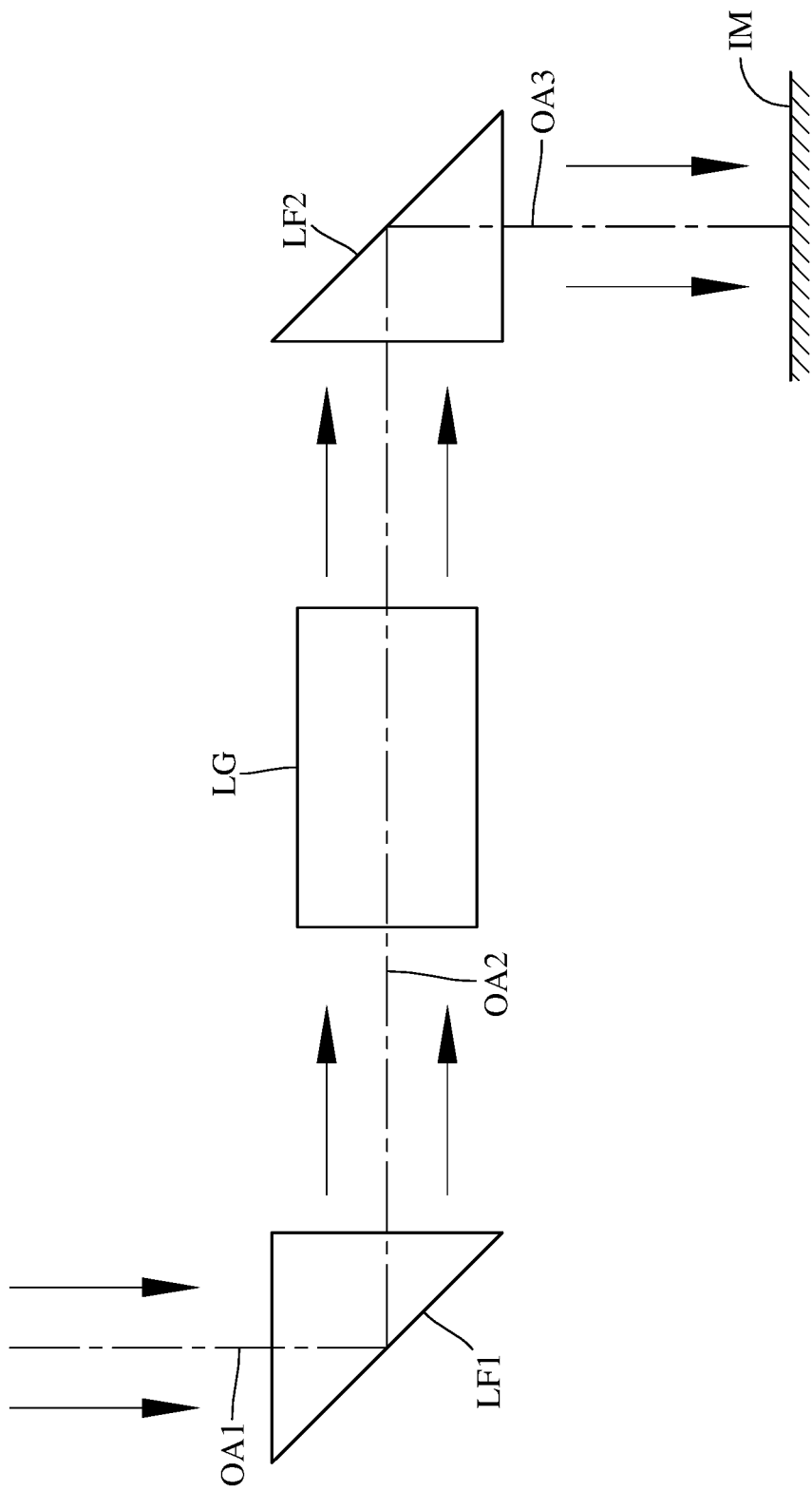
FIG. 30 shows a schematic view of a configuration of two light-folding elements in an image lens assembly according to one embodiment of the present disclosure.

According to the present disclosure, at least one light-folding element, such as a prism or a mirror, can be optionally disposed between an imaged object and the image surface on the imaging optical path, such that the image lens assembly can be more flexible in space arrangement, and therefore the dimensions of an electronic device is not restricted by the total track length of the image lens assembly. Specifically, please refer to FIG. 28 and FIG. 29. FIG. 28 shows a schematic view of a configuration of a light-folding element in an image lens assembly according to one embodiment of the present disclosure, and FIG. 29 shows a schematic view of another configuration of a light-folding element in an image lens assembly according to one embodiment of the present disclosure. In FIG. 28 and FIG. 29, the image lens assembly can have, in order from an imaged object (not shown in figure) to an image surface IM along an optical path, a first optical axis OA1, a light-folding element LF and a second optical axis OA2. The light-folding element LF can be disposed between the imaged object and a lens group LG of the image lens assembly as shown in FIG. 28 or disposed between a lens group LG of the image lens assembly and the image surface IM as shown in FIG. 29. Furthermore, please refer to FIG. 30, which shows a schematic view of a configuration of two light-folding elements in an image lens assembly according to one embodiment of the present disclosure. In FIG. 30, the image lens assembly can have, in order from an imaged object (not shown in figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the image lens assembly, and the second light-folding element LF2 is disposed between the lens group LG of the image lens assembly and the image surface IM. The image lens assembly can be optionally provided with three or more light-folding elements, and the present disclosure is not limited to the type, amount and position of the light-folding elements of the embodiments disclosed in the aforementioned figures.

According to the present disclosure, the image lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the image lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the image lens assembly and thereby provides a wider field of view for the same.

According to the present disclosure, the image lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
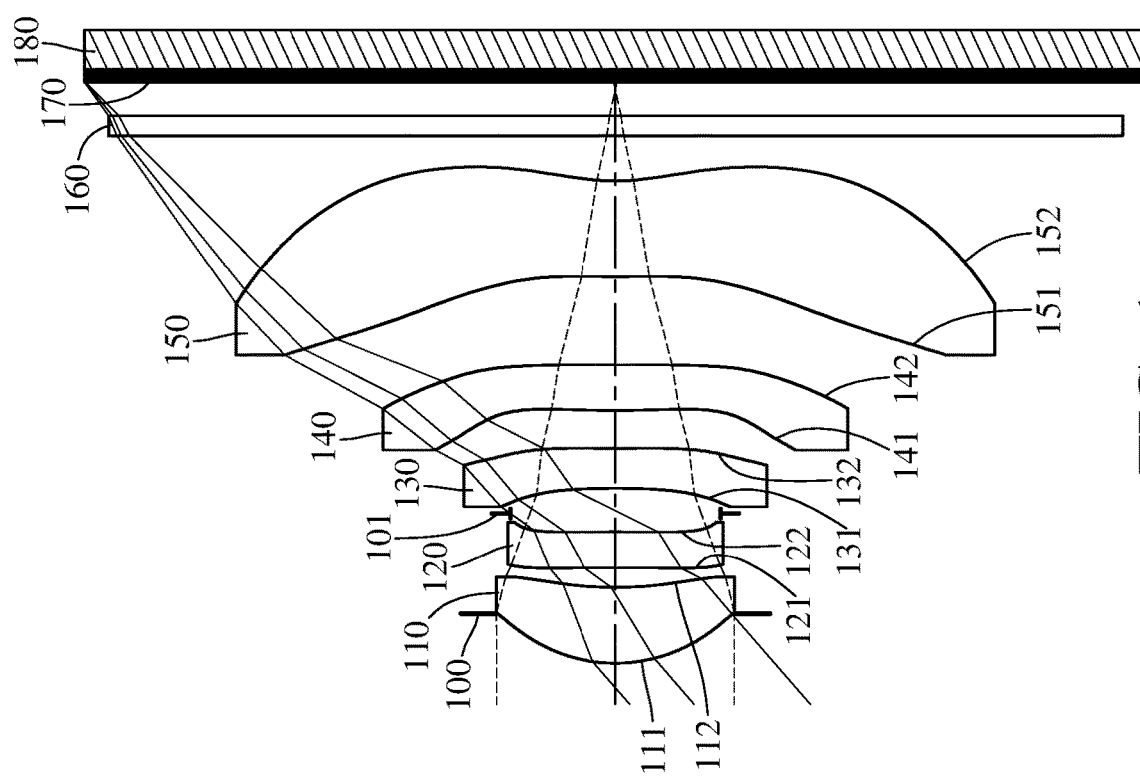
FIG. 1 is a schematic view of an image capturing unit according to the 1st embodiment of the present disclosure.
Figure 2:
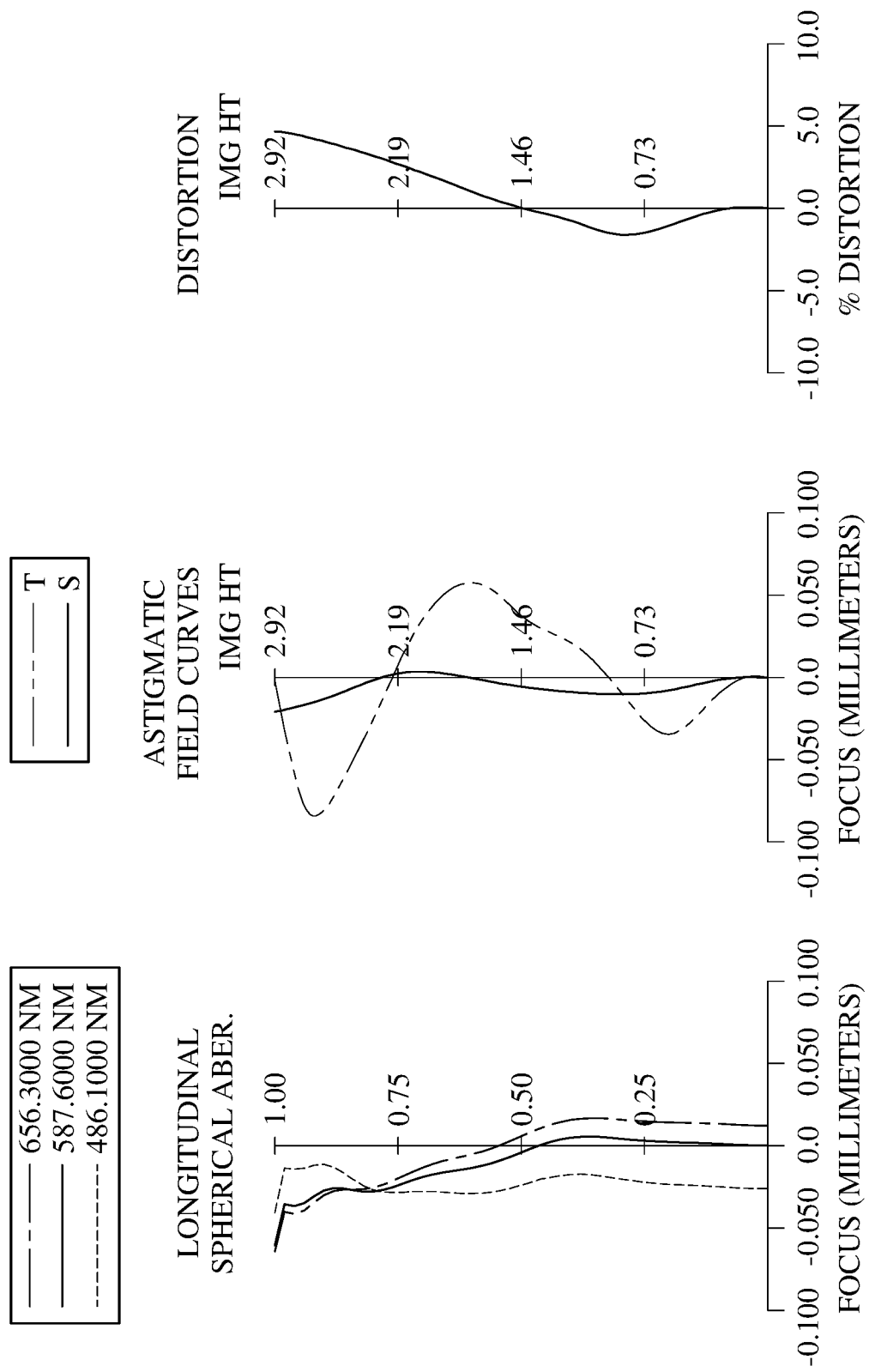
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the image lens assembly (its reference numeral is omitted) of the present disclosure and an image sensor 180. The image lens assembly includes, in order from an object side to an image side along an optical path, an aperture stop 100, a first lens element 110, a second lens element 120, a stop 101, a third lens element 130, a fourth lens element 140, a fifth lens element 150, a filter 160 and an image surface 170. The image lens assembly includes five lens elements (110, 120, 130, 140 and 150) with no additional lens element disposed between each of the adjacent five lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one concave critical point in an off-axis region thereof. The image-side surface 142 of the fourth lens element 140 has at least one convex critical point in an off-axis region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex critical point in an off-axis region thereof.

The filter 160 is made of glass material and located between the fifth lens element 150 and the image surface 170, and will not affect the focal length of the image lens assembly. The image sensor 180 is disposed on or near the image surface 170 of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is a displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the image lens assembly of the image capturing unit according to the 1st embodiment, when a focal length of the image lens assembly is f, an f-number of the image lens assembly is Fno, and half of a maximum field of view of the image lens assembly is HFOV, these parameters have the following values: f=3.17 millimeters (mm), Fno=2.46, HFOV=41.0 degrees (deg.).

When the maximum field of view of the image lens assembly is FOV, the following condition is satisfied: FOV=82.0 degrees.

When half of the maximum field of view of the image lens assembly is HFOV, the following condition is satisfied: tan(HFOV)=0.87.

When an Abbe number of the third lens element 130 is V3, and an Abbe number of the fourth lens element 140 is V4, the following condition is satisfied: V3+V4=69.2.

When an Abbe number of the first lens element 110 is V1, an Abbe number of the second lens element 120 is V2, the Abbe number of the third lens element 130 is V3, the Abbe number of the fourth lens element 140 is V4, an Abbe number of the fifth lens element 150 is V5, a refractive index of the first lens element 110 is N1, a refractive index of the second lens element 120 is N2, a refractive index of the third lens element 130 is N3, a refractive index of the fourth lens element 140 is N4, and a refractive index of the fifth lens element 150 is N5, the following conditions are satisfied: V1/N1=36.26; V2/N2=8.21; V3/N3=14.59; V4/N4=29.68; and V5/N5=25.95.

When a minimum value among the Abbe numbers of all lens elements of the image lens assembly is Vmin, the following condition is satisfied: Vmin=14.0. In this embodiment, among the first through fifth lens elements (110-150), the Abbe number of the second lens element 120 is smaller than the Abbe numbers of the other lens elements, and Vmin is equal to the Abbe number of the second lens element 120.

When an axial distance between the object-side surface 111 of the first lens element 110 and the image-side surface 152 of the fifth lens element 150 is Td, and an entrance pupil diameter of the image lens assembly is EPD, the following condition is satisfied: Td/EPD=2.03.

When a maximum image height of the image lens assembly is ImgH, and an axial distance between the image-side surface 152 of the fifth lens element 150 and the image surface 170 is BL, the following condition is satisfied: ImgH/BL=5.37.

When a curvature radius of the object-side surface 111 of the first lens element 110 is R1, and a curvature radius of the image-side surface 122 of the second lens element 120 is R4, the following condition is satisfied: (R1+R4)/(R1−R4)=−0.91.

When a curvature radius of the object-side surface 121 of the second lens element 120 is R3, and the curvature radius of the image-side surface 122 of the second lens element 120 is R4, the following condition is satisfied: (R3+R4)/(R3−R4)=23.17.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=−1.27.

When a curvature radius of the object-side surface 151 of the fifth lens element 150 is R9, and a curvature radius of the image-side surface 152 of the fifth lens element 150 is R10, the following condition is satisfied: (R9+R10)/(R9−R10)=1.40.

When a curvature radius of the image-side surface 112 of the first lens element 110 is R2, and the curvature radius of the object-side surface 121 of the second lens element 120 is R3, the following condition is satisfied: R2/R3=−0.10.

When the curvature radius of the object-side surface 141 of the fourth lens element 140 is R7, and the curvature radius of the image-side surface 142 of the fourth lens element 140 is R8, the following condition is satisfied: |R8/R7|=8.32.

When a focal length of the first lens element 110 is f1, and a focal length of the second lens element 120 is f2, the following condition is satisfied: f1/f2=0.01.

When the focal length of the second lens element 120 is f2, and a focal length of the third lens element 130 is f3, the following condition is satisfied: |f3/f2|=0.02.

When the focal length of the image lens assembly is f, and a curvature radius of the object-side surface 131 of the third lens element 130 is R5, the following condition is satisfied: f/R5=−0.48.

When the focal length of the image lens assembly is f, a focal length of the fourth lens element 140 is f4, and a focal length of the fifth lens element 150 is f5, the following condition is satisfied: (f/f4)−(f/f5)=1.41.

The detailed optical data of the 1st embodiment are shown in Table 1 and the aspheric surface data are shown in Table 2 below.

TABLE 1

1st Embodiment
f = 3.17 mm, Fno = 2.46, HFOV = 41.0 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.275 | | | | |
| 2 | Lens 1 | 0.868 | (ASP) | 0.419 | Plastic | 1.544 | 56.0 | 2.41 |
| 3 | | 2.128 | (ASP) | 0.108 | | | | |
| 4 | Lens 2 | −21.307 | (ASP) | 0.200 | Plastic | 1.705 | 14.0 | 320.08 |
| 5 | | −19.545 | (ASP) | 0.102 | | | | |
| 6 | Stop | Plano | | 0.138 | | | | |
| 7 | Lens 3 | −6.586 | (ASP) | 0.220 | Plastic | 1.634 | 23.8 | −6.13 |
| 8 | | 9.592 | (ASP) | 0.210 | | | | |
| 9 | Lens 4 | 5.160 | (ASP) | 0.250 | Plastic | 1.529 | 45.4 | 11.06 |
| 10 | | 42.915 | (ASP) | 0.486 | | | | |
| 11 | Lens 5 | 7.549 | (ASP) | 0.531 | Plastic | 1.559 | 40.4 | −2.82 |
| 12 | | 1.270 | (ASP) | 0.250 | | | | |
| 13 | Filter | Plano | | 0.110 | Glass | 1.517 | 64.2 | — |
| 14 | | Plano | | 0.184 | | | | |
| 15 | Image | Plano | | 0.000 | | | | |

Note:
Reference wavelength is 587.6 nm (d-line).
An effective radius of the stop 101 (Surface 6) is 0.580 mm.

TABLE 2

Aspheric Coefficients

| Surface # | 2 | 3 | 4 | 5 | 7 |
|---|---|---|---|---|---|
| k = | −1.1109E+01 | 0.0000E+00 | 0.0000E+00 | 0.0000E+00 | 0.0000E+00 |
| A4 = | 2.0018E+00 | −1.6718E−01 | −1.1101E−01 | −2.2434E−01 | −8.3530E−01 |
| A6 = | −8.8244E+00 | 2.8126E+00 | 2.8968E+00 | 1.6862E+01 | 7.2277E+00 |
| A8 = | 3.6250E+01 | −3.5381E+01 | −2.8597E+01 | −3.7909E+02 | −9.9203E+01 |
| A10 = | −9.7452E+01 | 2.1359E+02 | 1.8836E+02 | 5.0750E+03 | 8.8300E+02 |
| A12 = | 1.4967E+02 | −7.1881E+02 | −6.7337E+02 | −4.0702E+04 | −4.9711E+03 |
| A14 = | −1.0254E+02 | 1.2382E+03 | 1.2466E+03 | 2.0038E+05 | 1.7582E+04 |
| A16 = | — | −8.5727E+02 | −9.2923E+02 | −5.9152E+05 | −3.7664E+04 |
| A18 = | — | — | — | 9.5984E+05 | 4.4456E+04 |
| A20 = | — | — | — | −6.5667E+05 | −2.2101E+04 |

| Surface # | 8 | 9 | 10 | 11 | 12 |
|---|---|---|---|---|---|
| k = | 0.0000E+00 | 0.0000E+00 | −7.8801E+01 | 0.0000E+00 | −2.6165E+00 |
| A4 = | −7.5830E−01 | −3.4868E−01 | −2.3926E−01 | −7.7201E−01 | −7.4705E−01 |
| A6 = | 3.2365E+00 | 8.7522E−02 | 6.4148E−01 | 1.2813E+00 | 1.0525E+00 |
| A8 = | −2.0835E+01 | −2.8268E−01 | −8.3118E−01 | −1.3540E+00 | −9.7621E−01 |

TABLE 2-continued

| Aspheric Coefficients | | | | | |
|---|---|---|---|---|---|
| A10 = | 9.5683E+01 | 1.3631E+00 | −1.5130E+00 | 9.5031E−01 | 5.9221E−01 |
| A12 = | −2.9074E+02 | −1.3934E+01 | 5.4870E+00 | −4.3768E−01 | −2.3640E−01 |
| A14 = | 5.7857E+02 | 3.9731E+01 | −6.5540E+00 | 1.2991E−01 | 6.1270E−02 |
| A16 = | −7.1023E+02 | −4.8265E+01 | 3.9513E+00 | −2.3900E−02 | −9.8812E−03 |
| A18 = | 4.8140E+02 | 2.7365E+01 | −1.2139E+00 | 2.4798E−03 | 8.9713E−04 |
| A20 = | −1.3709E+02 | −6.0390E+00 | 1.5126E−01 | −1.1104E−04 | −3.4890E−05 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
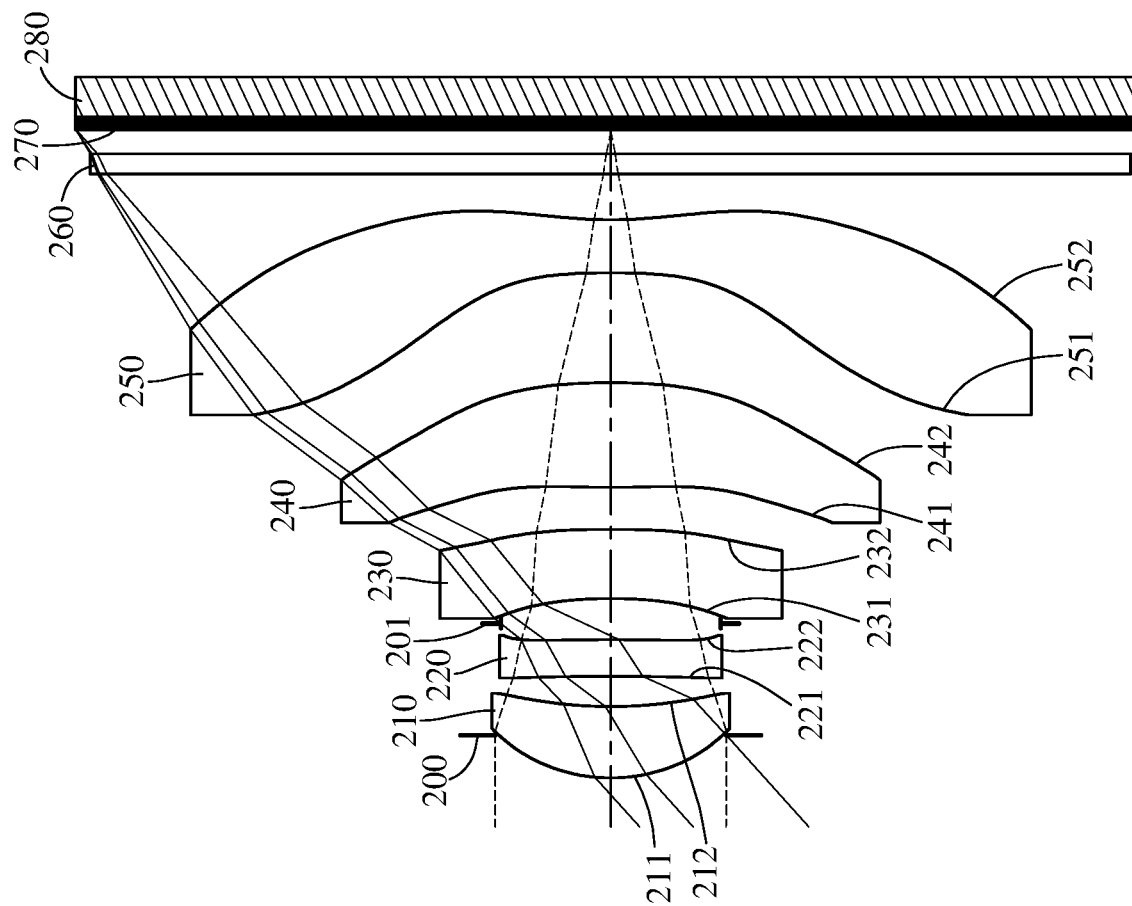
FIG. 3 is a schematic view of an image capturing unit according to the 2nd embodiment of the present disclosure.
Figure 4:
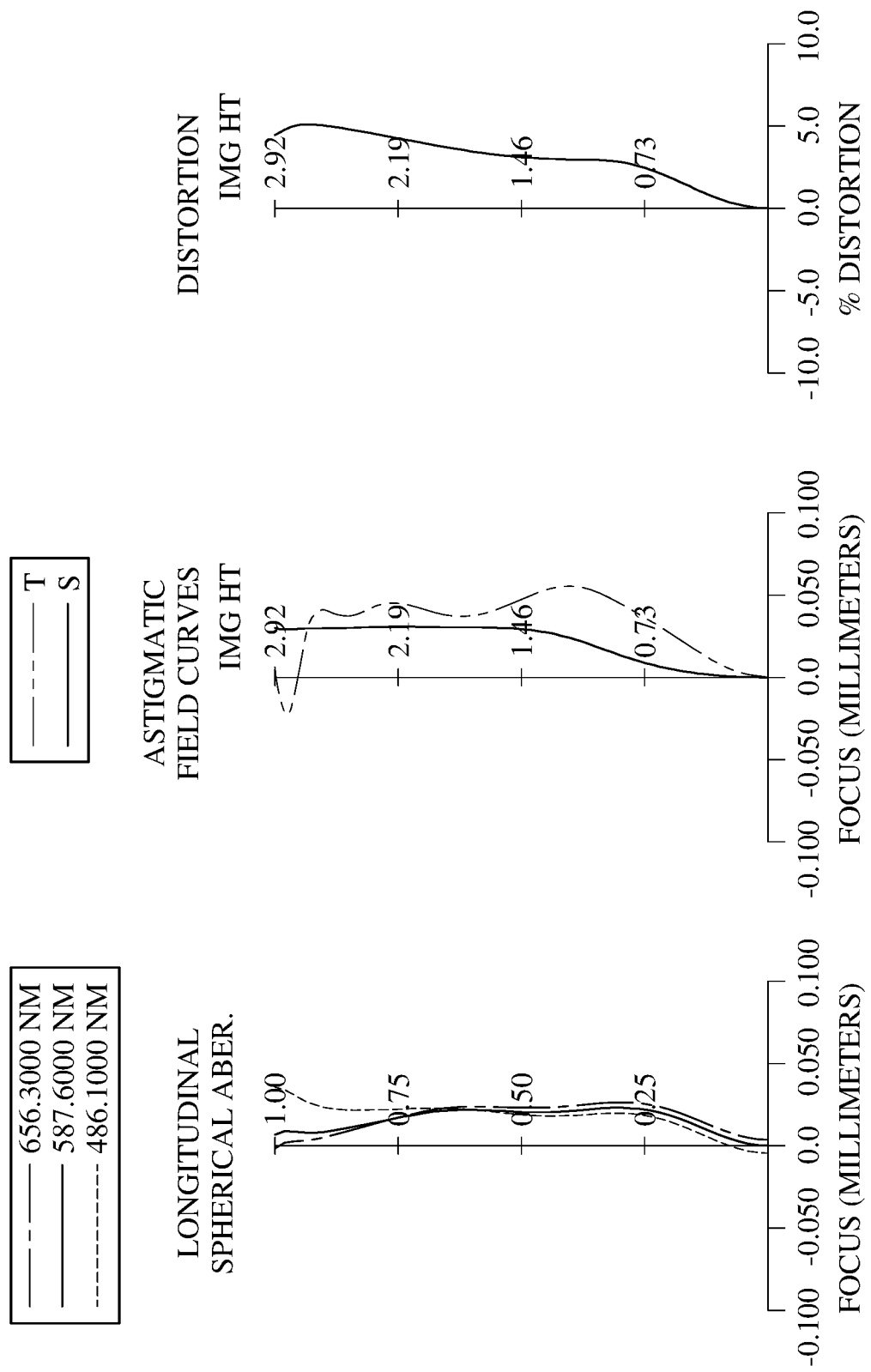
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the image lens assembly (its reference numeral is omitted) of the present disclosure and an image sensor 280. The image lens assembly includes, in order from an object side to an image side along an optical path, an aperture stop 200, a first lens element 210, a second lens element 220, a stop 201, a third lens element 230, a fourth lens element 240, a fifth lens element 250, a filter 260 and an image surface 270. The image lens assembly includes five lens elements (210, 220, 230, 240 and 250) with no additional lens element disposed between each of the adjacent five lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has at least one concave critical point in an off-axis region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex critical point in an off-axis region thereof.

The filter 260 is made of glass material and located between the fifth lens element 250 and the image surface 270, and will not affect the focal length of the image lens assembly. The image sensor 280 is disposed on or near the image surface 270 of the image lens assembly.

The detailed optical data of the 2nd embodiment are shown in Table 3 and the aspheric surface data are shown in Table 4 below.

TABLE 3

2nd Embodiment
f = 3.05 mm, Fno = 2.45, HFOV = 42.0 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.233 | | | | |
| 2 | Lens 1 | 0.941 | (ASP) | 0.390 | Plastic | 1.534 | 55.9 | 2.61 |
| 3 | | 2.480 | (ASP) | 0.165 | | | | |
| 4 | Lens 2 | −24.919 | (ASP) | 0.200 | Plastic | 1.658 | 17.1 | 102.78 |
| 5 | | −18.267 | (ASP) | 0.088 | | | | |
| 6 | Stop | Plano | | 0.137 | | | | |
| 7 | Lens 3 | −2.850 | (ASP) | 0.381 | Plastic | 1.705 | 14.0 | −5.70 |
| 8 | | −10.335 | (ASP) | 0.230 | | | | |
| 9 | Lens 4 | 5.436 | (ASP) | 0.572 | Plastic | 1.529 | 45.4 | 4.30 |
| 10 | | −3.768 | (ASP) | 0.600 | | | | |
| 11 | Lens 5 | −5.194 | (ASP) | 0.290 | Plastic | 1.566 | 37.4 | −2.89 |

TABLE 3-continued

2nd Embodiment
f = 3.05 mm, Fno = 2.45, HFOV = 42.0 deg.

| Surface # | | Curvature Radius | | Thickness | Material | Index | Abbe # | Focal Length |
|---|---|---|---|---|---|---|---|---|
| 12 | | 2.439 | (ASP) | 0.250 | | | | |
| 13 | Filter | Plano | | 0.110 | Glass | 1.517 | 64.2 | — |
| 14 | | Plano | | 0.131 | | | | |
| 15 | Image | Plano | | 0.000 | | | | |

Note:
Reference wavelength is 587.6 nm (d-line).
An effective radius of the stop 201 (Surface 6) is 0.600 mm.

TABLE 4

Aspheric Coefficients

| Surface # | 2 | 3 | 4 | 5 | 7 |
|---|---|---|---|---|---|
| k = | −9.5374E+00 | 0.0000E+00 | 0.0000E+00 | 0.0000E+00 | 0.0000E+00 |
| A4 = | 1.4217E+00 | −2.2431E−02 | −1.6207E−01 | 8.8657E−02 | −3.4231E−01 |
| A6 = | −4.8449E+00 | 5.4115E−01 | 1.2996E+00 | −3.7061E+00 | −6.6258E−01 |
| A8 = | 1.8260E+01 | −7.0169E+00 | −1.3617E+01 | 6.6700E+01 | 1.7412E+01 |
| A10 = | −4.6281E+01 | 4.7037E+01 | 9.6477E+01 | −6.2573E+02 | −1.5387E+02 |
| A12 = | 6.9354E+01 | −1.8082E+02 | −3.6613E+02 | 3.7170E+03 | 7.9410E+02 |
| A14 = | −4.4435E+01 | 3.6610E+02 | 7.2313E+02 | −1.3858E+04 | −2.4889E+03 |
| A16 = | — | −3.0793E+02 | −5.8895E+02 | 3.1629E+04 | 4.6494E+03 |
| A18 = | — | — | — | −4.0404E+04 | −4.7711E+03 |
| A20 = | — | — | — | 2.2304E+04 | 2.0869E+03 |

| Surface # | 8 | 9 | 10 | 11 | 12 |
|---|---|---|---|---|---|
| k = | 0.0000E+00 | 0.0000E+00 | 3.0924E+00 | 0.0000E+00 | −1.1451E+00 |
| A4 = | −5.1605E−01 | −5.8712E−01 | −2.1450E−01 | −4.4066E−01 | −2.6681E−01 |
| A6 = | 1.5985E+00 | 1.2143E+00 | 2.0835E−01 | 1.5663E−01 | 9.3996E−02 |
| A8 = | −5.0478E+00 | −3.1194E+00 | −1.7632E−01 | 2.0867E−01 | 1.5227E−02 |
| A10 = | 1.3313E+01 | 5.7391E+00 | −1.4535E−01 | −2.3700E−01 | −2.9581E−02 |
| A12 = | −2.3683E+01 | −6.2709E+00 | 6.3794E−01 | 1.1214E−01 | 1.3392E−02 |
| A14 = | 2.8671E+01 | 4.0303E+00 | −6.9399E−01 | −2.9830E−02 | −3.2899E−03 |
| A16 = | −2.3803E+01 | −1.4766E+00 | 3.5921E−01 | 4.6304E−03 | 4.7330E−04 |
| A18 = | 1.2279E+01 | 2.7597E−01 | −9.1849E−02 | −3.9243E−04 | −3.7319E−05 |
| A20 = | −2.8984E+00 | −1.9189E−02 | 9.3385E−03 | 1.4065E−05 | 1.2382E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.05 | Td/EPD | 2.42 |
| Fno | 2.45 | ImgH/BL | 5.94 |
| HFOV [deg.] | 42.0 | (R1 + R4)/(R1 − R4) | −0.90 |
| FOV [deg.] | 84.0 | (R3 + R4)/(R3 − R4) | 6.49 |
| tan(HFOV) | 0.90 | (R7 + R8)/(R7 − R8) | 0.18 |
| V3 + V4 | 59.4 | (R9 + R10)/(R9 − R10) | 0.36 |
| V1/N1 | 36.46 | R2/R3 | −0.10 |
| V2/N2 | 10.31 | |R8/R7| | 0.69 |
| V3/N3 | 8.21 | f1/f2 | 0.03 |
| V4/N4 | 29.68 | |f3/f2| | 0.06 |
| V5/N5 | 23.91 | f/R5 | −1.07 |
| Vmin | 14.0 | (f/f4) − (f/f5) | 1.77 |

3rd Embodiment

Figure 5:
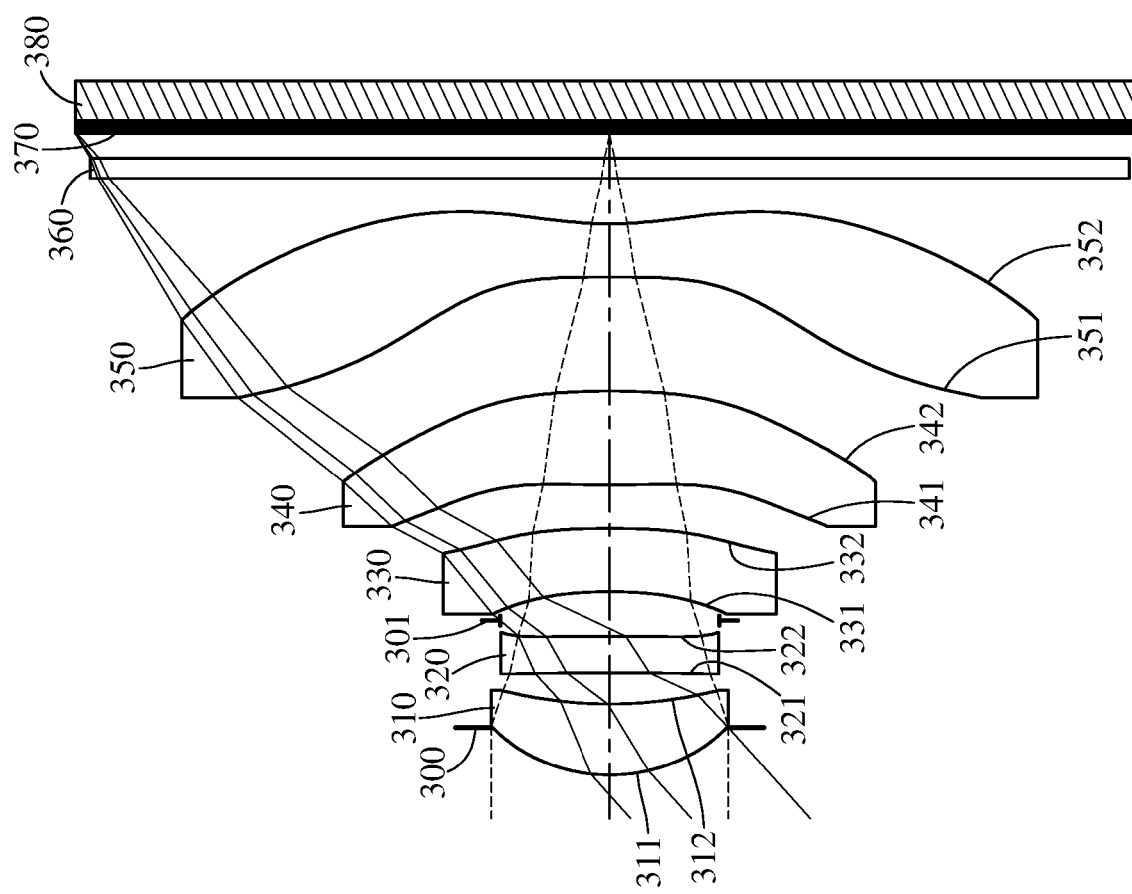
FIG. 5 is a schematic view of an image capturing unit according to the 3rd embodiment of the present disclosure.
Figure 6:
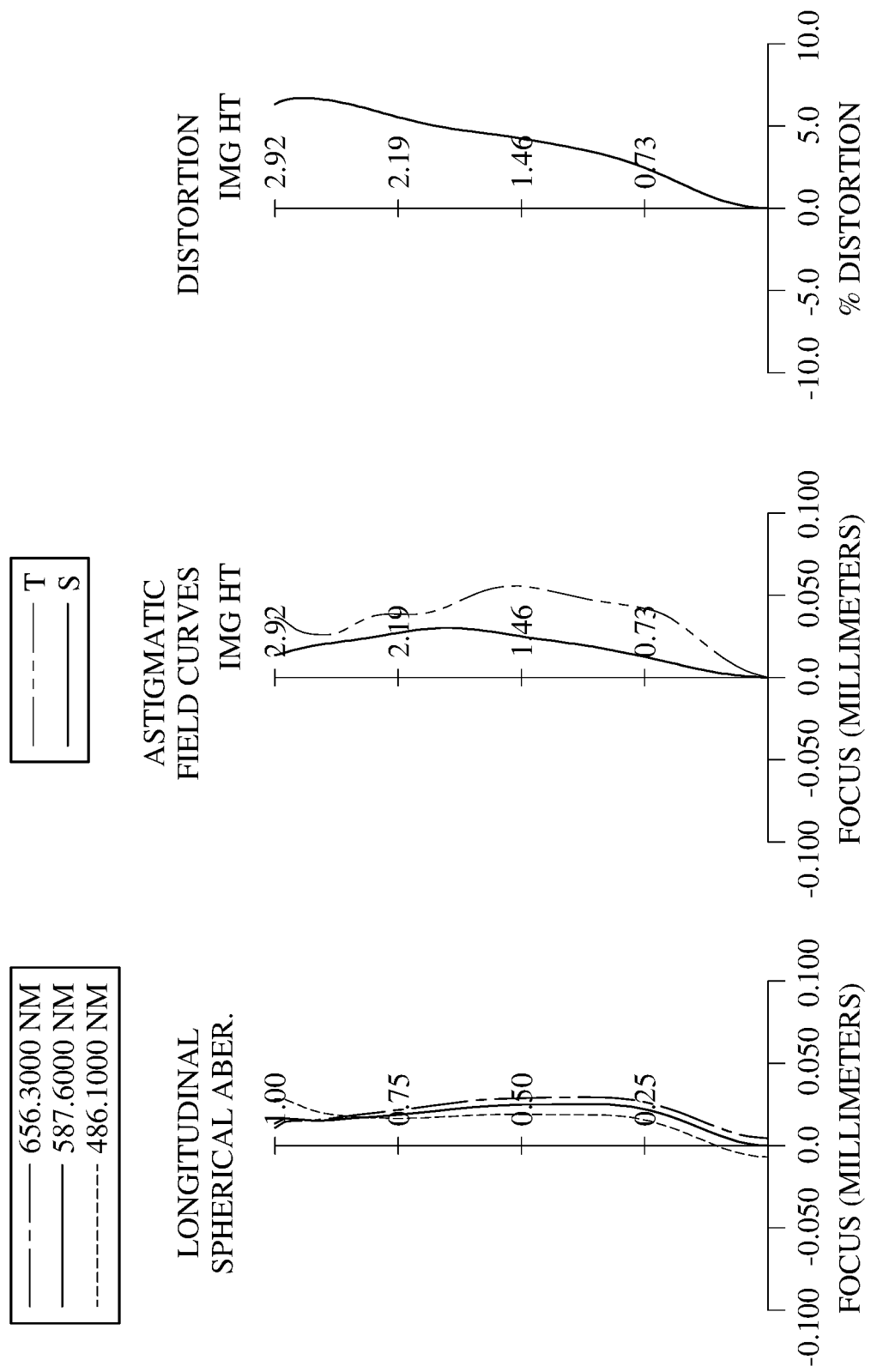
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the image lens assembly (its reference numeral is omitted) of the present disclosure and an image sensor 380. The image lens assembly includes, in order from an object side to an image side along an optical path, an aperture stop 300, a first lens element 310, a second lens element 320, a stop 301, a third lens element 330, a fourth lens element 340, a fifth lens element 350, a filter 360 and an image surface 370. The image lens assembly includes five lens elements (310, 320, 330, 340 and 350) with no additional lens element disposed between each of the adjacent five lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one concave critical point in an off-axis region thereof.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex critical point in an off-axis region thereof.

The filter 360 is made of glass material and located between the fifth lens element 350 and the image surface 370, and will not affect the focal length of the image lens assembly. The image sensor 380 is disposed on or near the image surface 370 of the image lens assembly.

The detailed optical data of the 3rd embodiment are shown in Table 5 and the aspheric surface data are shown in Table 6 below.

TABLE 5

3rd Embodiment
f = 3.05 mm, Fno = 2.35, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.260 | | | | |
| 2 | Lens 1 | 0.952 | (ASP) | 0.390 | Plastic | 1.534 | 55.9 | 2.68 |
| 3 | | 2.432 | (ASP) | 0.170 | | | | |
| 4 | Lens 2 | −54.178 | (ASP) | 0.200 | Plastic | 1.660 | 20.4 | 76.89 |
| 5 | | −26.240 | (ASP) | 0.086 | | | | |
| 6 | Stop | Plano | | 0.158 | | | | |
| 7 | Lens 3 | −2.590 | (ASP) | 0.346 | Plastic | 1.705 | 14.0 | −6.39 |
| 8 | | −6.427 | (ASP) | 0.238 | | | | |
| 9 | Lens 4 | 5.951 | (ASP) | 0.516 | Plastic | 1.534 | 55.9 | 4.97 |
| 10 | | −4.640 | (ASP) | 0.623 | | | | |
| 11 | Lens 5 | −42.005 | (ASP) | 0.292 | Plastic | 1.566 | 37.4 | −3.37 |
| 12 | | 2.002 | (ASP) | 0.250 | | | | |
| 13 | Filter | Plano | | 0.110 | Glass | 1.517 | 64.2 | — |
| 14 | | Plano | | 0.136 | | | | |
| 15 | Image | Plano | | 0.000 | | | | |

Note:
Reference wavelength is 587.6 nm (d-line).
An effective radius of the stop 301 (Surface 6) is 0.600 mm.

TABLE 6

Aspheric Coefficients

| Surface # | 2 | 3 | 4 | 5 | 7 |
|---|---|---|---|---|---|
| k = | −9.5325E+00 | 0.0000E+00 | 0.0000E+00 | 0.0000E+00 | 0.0000E+00 |
| A4 = | 1.3492E+00 | −2.1158E−03 | −8.2518E−02 | −8.2994E−03 | −4.7884E−01 |
| A6 = | −4.2380E+00 | 4.5894E−01 | 2.7994E−01 | −5.7708E−03 | 2.7897E+00 |
| A8 = | 1.4639E+01 | −5.0190E+00 | −2.8500E+00 | 4.6340E+00 | −3.0930E+01 |
| A10 = | −3.3780E+01 | 3.0070E+01 | 2.5296E+01 | −3.9303E+01 | 2.4892E+02 |
| A12 = | 4.6670E+01 | −1.0535E+02 | −1.0401E+02 | 2.8550E+02 | −1.2879E+03 |
| A14 = | −2.7687E+01 | 1.9698E+02 | 2.1464E+02 | −1.3065E+03 | 4.2063E+03 |
| A16 = | — | −1.5776E+02 | −1.8398E+02 | 3.6318E+03 | −8.3270E+03 |
| A18 = | — | — | — | −5.5692E+03 | 9.0658E+03 |
| A20 = | — | — | — | 3.7268E+03 | −4.1457E+03 |

| Surface # | 8 | 9 | 10 | 11 | 12 |
|---|---|---|---|---|---|
| k = | 0.0000E+00 | 0.0000E+00 | 7.4546E+00 | 0.0000E+00 | −1.3120E+00 |
| A4 = | −4.9355E−01 | −5.1556E−01 | −1.8282E−01 | −4.3284E−01 | −3.0931E−01 |
| A6 = | 1.2856E+00 | 7.0077E−01 | 1.7329E−01 | 1.8087E−01 | 1.5489E−01 |
| A8 = | −4.2851E+00 | −1.7060E+00 | −3.5258E−01 | 9.5750E−02 | −2.9197E−02 |
| A10 = | 1.4451E+01 | 3.4805E+00 | 5.0367E−01 | −1.1704E−01 | −1.2787E−02 |
| A12 = | −3.5324E+01 | −4.2867E+00 | −2.8252E−01 | 4.9665E−02 | 1.0094E−02 |
| A14 = | 5.9352E+01 | 3.2460E+00 | −4.4625E−03 | −1.1513E−02 | −2.9938E−03 |
| A16 = | −6.3390E+01 | −1.4959E+00 | 7.0720E−02 | 1.5440E−03 | 4.7136E−04 |

TABLE 6-continued

| Aspheric Coefficients | | | | | |
| --- | --- | --- | --- | --- | --- |
| A18 = | 3.7769E+01 | 3.8281E−01 | −2.8114E−02 | −1.1273E−04 | −3.8772E−05 |
| A20 = | −9.4528E+00 | −4.1247E−02 | 3.5565E−03 | 3.4759E−06 | 1.3083E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
| --- | --- | --- | --- |
| f [mm] | 3.05 | Td/EPD | 2.33 |
| Fno | 2.35 | ImgH/BL | 5.89 |
| HFOV [deg.] | 41.9 | (R1 + R4)/(R1 − R4) | −0.93 |
| FOV [deg.] | 83.8 | (R3 + R4)/(R3 − R4) | 2.88 |
| tan(HFOV) | 0.90 | (R7 + R8)/(R7 − R8) | 0.12 |
| V3 + V4 | 69.9 | (R9 + R10)/(R9 − R10) | 0.91 |
| V1/N1 | 36.46 | R2/R3 | −0.04 |
| V2/N2 | 12.29 | |R8/R7| | 0.78 |
| V3/N3 | 8.21 | f1/f2 | 0.03 |
| V4/N4 | 36.46 | |f3/f2| | 0.08 |
| V5/N5 | 23.91 | f/R5 | −1.18 |
| Vmin | 14.0 | (f/f4) − (f/f5) | 1.52 |

4th Embodiment

Figure 7:
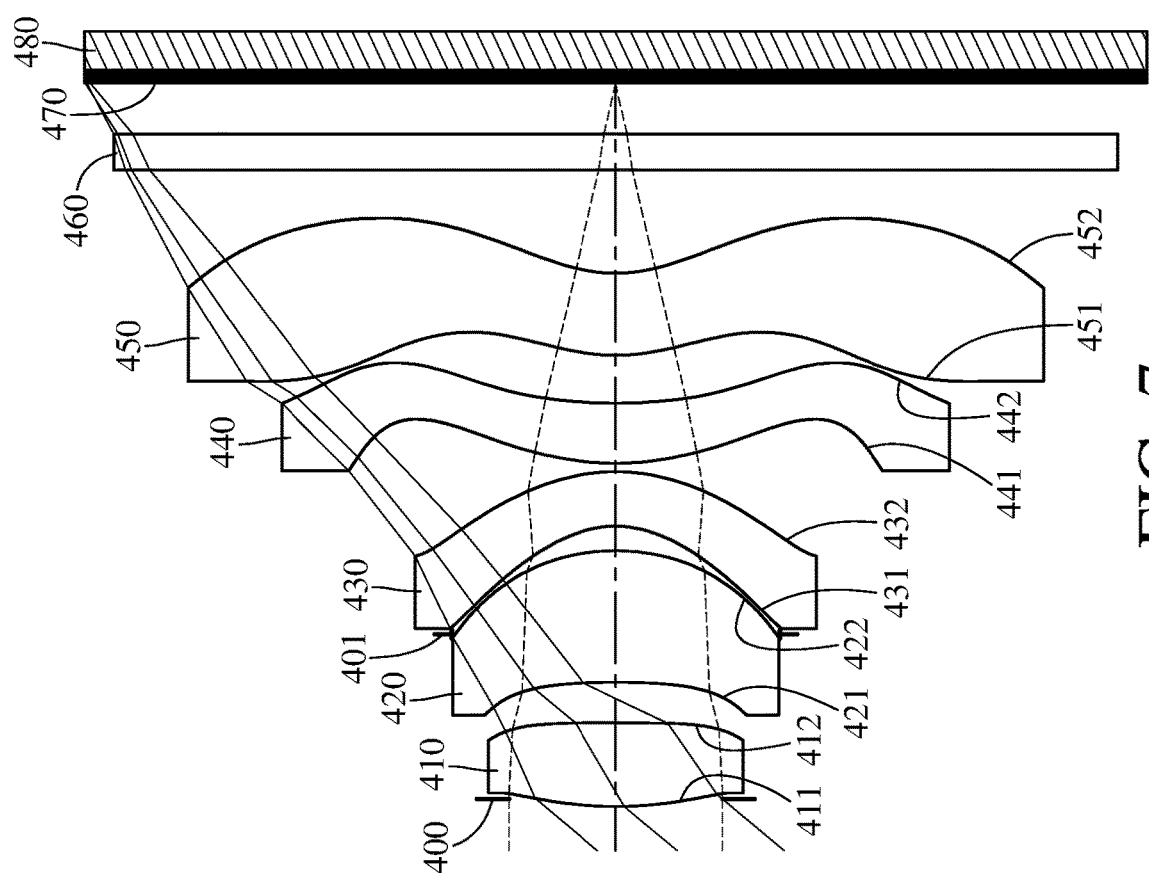
FIG. 7 is a schematic view of an image capturing unit according to the 4th embodiment of the present disclosure.
Figure 8:
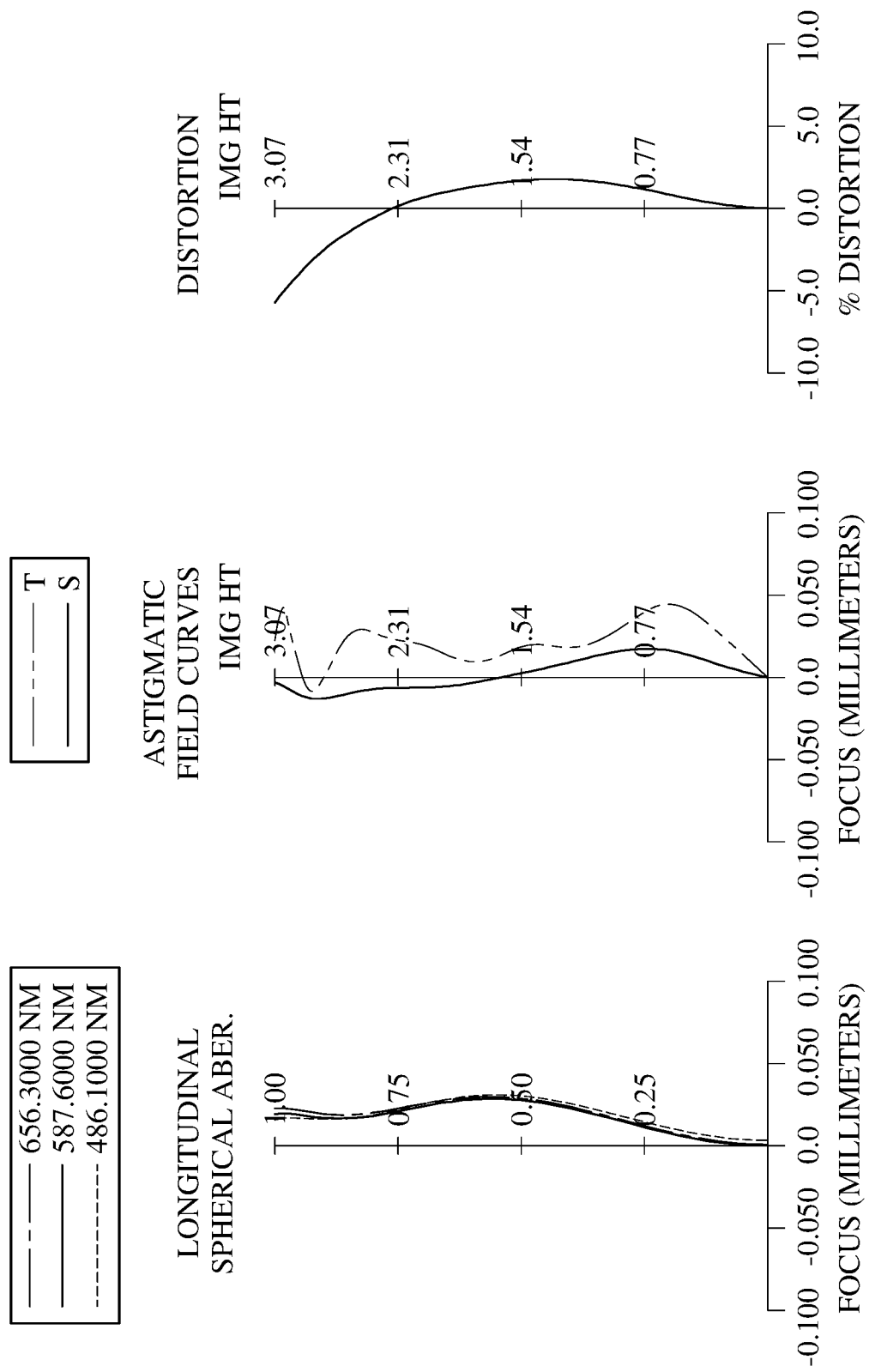
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the image lens assembly (its reference numeral is omitted) of the present disclosure and an image sensor 480. The image lens assembly includes, in order from an object side to an image side along an optical path, an aperture stop 400, a first lens element 410, a second lens element 420, a stop 401, a third lens element 430, a fourth lens element 440, a fifth lens element 450, a filter 460 and an image surface 470. The image lens assembly includes five lens elements (410, 420, 430, 440 and 450) with no additional lens element disposed between each of the adjacent five lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one concave critical point in an off-axis region thereof. The image-side surface 442 of the fourth lens element 440 has at least one convex critical point in an off-axis region thereof.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex critical point in an off-axis region thereof.

The filter 460 is made of glass material and located between the fifth lens element 450 and the image surface 470, and will not affect the focal length of the image lens assembly. The image sensor 480 is disposed on or near the image surface 470 of the image lens assembly.

The detailed optical data of the 4th embodiment are shown in Table 7 and the aspheric surface data are shown in Table 8 below.

TABLE 7

4th Embodiment
f = 2.73 mm, Fno = 2.20, HFOV = 50.0 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Ape. Stop | Plano | | −0.042 | | | | |
| 2 | Lens 1 | 2.206 | (ASP) | 0.485 | Plastic | 1.545 | 56.1 | 3.78 |
| 3 | | −28.184 | (ASP) | 0.234 | | | | |
| 4 | Lens 2 | −4.826 | (ASP) | 0.766 | Plastic | 1.545 | 56.1 | 2.67 |
| 5 | | −1.182 | (ASP) | −0.487 | | | | |
| 6 | Stop | Plano | | 0.630 | | | | |
| 7 | Lens 3 | −0.583 | (ASP) | 0.315 | Plastic | 1.669 | 19.5 | −2.46 |

TABLE 7-continued

4th Embodiment
f = 2.73 mm, Fno = 2.20, HFOV = 50.0 deg.

| Surface # | | Curvature Radius | | Thickness | Material | Index | Abbe # | Focal Length |
|---|---|---|---|---|---|---|---|---|
| 8 | | −1.099 | (ASP) | 0.048 | | | | |
| 9 | Lens 4 | 1.551 | (ASP) | 0.350 | Plastic | 1.566 | 37.4 | 5.42 |
| 10 | | 2.883 | (ASP) | 0.277 | | | | |
| 11 | Lens 5 | 1.115 | (ASP) | 0.478 | Plastic | 1.545 | 56.1 | −25.31 |
| 12 | | 0.876 | (ASP) | 0.600 | | | | |
| 13 | Filter | Plano | | 0.210 | Glass | 1.517 | 64.2 | — |
| 14 | | Plano | | 0.293 | | | | |
| 15 | Image | Plano | | 0.000 | | | | |

Note:
Reference wavelength is 587.6 nm (d-line).
An effective radius of the stop 401 (Surface 6) is 0.950 mm.

TABLE 8

Aspheric Coefficients

| Surface # | 2 | 3 | 4 | 5 | 7 |
|---|---|---|---|---|---|
| k = | 5.8335E−01 | 9.0000E+01 | 7.5655E+00 | −1.5803E+00 | −9.5914E−01 |
| A4 = | −6.2507E−02 | −1.6773E−01 | −2.0320E−01 | 7.9956E−02 | 1.0191E+00 |
| A6 = | −6.6950E−02 | −1.6238E−01 | −2.3095E−01 | −1.4740E+00 | −4.3415E+00 |
| A8 = | 2.2745E−02 | −2.1720E−01 | 8.9386E−02 | 2.7905E+00 | 1.2321E+01 |
| A10 = | −3.8237E−01 | 5.1828E−02 | −9.0900E−01 | −1.2379E+01 | −2.0536E+01 |
| A12 = | — | — | 9.0873E−01 | −5.9394E+00 | 2.1565E+01 |
| A14 = | — | — | — | 6.7769E+00 | −1.5917E+01 |
| A16 = | — | — | — | −2.3090E+00 | 8.3483E+00 |
| A18 = | — | — | — | — | −2.2020E+00 |

| Surface # | 8 | 9 | 10 | 11 | 12 |
|---|---|---|---|---|---|
| k = | −8.6279E−01 | −7.1670E−01 | 4.8878E−01 | −9.9298E−01 | −1.5902E+00 |
| A4 = | 2.3206E−01 | −2.4947E−01 | −8.0232E−02 | −5.1139E−01 | −3.7764E−01 |
| A6 = | −1.0179E+00 | 6.3836E−01 | 4.7892E−01 | 2.9731E−01 | 2.7463E−01 |
| A8 = | 2.9252E+00 | −1.1085E+00 | −8.2306E−01 | −1.8246E−01 | −1.5351E−01 |
| A10 = | −4.9620E+00 | 1.1626E+00 | 6.7364E−01 | 9.8882E−02 | 6.2519E−02 |
| A12 = | 5.1765E+00 | −8.6847E−01 | −3.2594E−01 | −3.5455E−02 | −1.7523E−02 |
| A14 = | −3.2719E+00 | 4.6074E−01 | 9.7613E−02 | 7.8587E−03 | 3.2457E−03 |
| A16 = | 1.1539E+00 | −1.6123E−01 | −1.7701E−02 | −1.0448E−03 | −3.7789E−04 |
| A18 = | −1.7195E−01 | 3.2431E−02 | 1.7767E−03 | 7.6719E−05 | 2.4983E−05 |
| A20 = | — | −2.7777E−03 | −7.5680E−05 | −2.3988E−06 | −7.1326E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.73 | Td/EPD | 2.50 |
| Fno | 2.20 | ImgH/BL | 2.79 |
| HFOV [deg.] | 50.0 | (R1 + R4)/(R1 − R4) | 0.30 |
| FOV [deg.] | 100.0 | (R3 + R4)/(R3 − R4) | 1.65 |
| tan(HFOV) | 1.19 | (R7 + R8)/(R7 − R8) | −3.33 |
| V3 + V4 | 56.9 | (R9 + R10)/(R9 − R10) | 8.32 |
| V1/N1 | 36.30 | R2/R3 | 5.84 |
| V2/N2 | 36.30 | |R8/R7| | 1.86 |

-continued

| 4th Embodiment | | | |
|---|---|---|---|
| V3/N3 | 11.65 | f1/f2 | 1.41 |
| V4/N4 | 23.91 | |f3/f2| | 0.92 |
| V5/N5 | 36.30 | f/R5 | −4.67 |
| Vmin | 19.5 | (f/f4) − (f/f5) | 0.61 |

5th Embodiment

Figure 9:
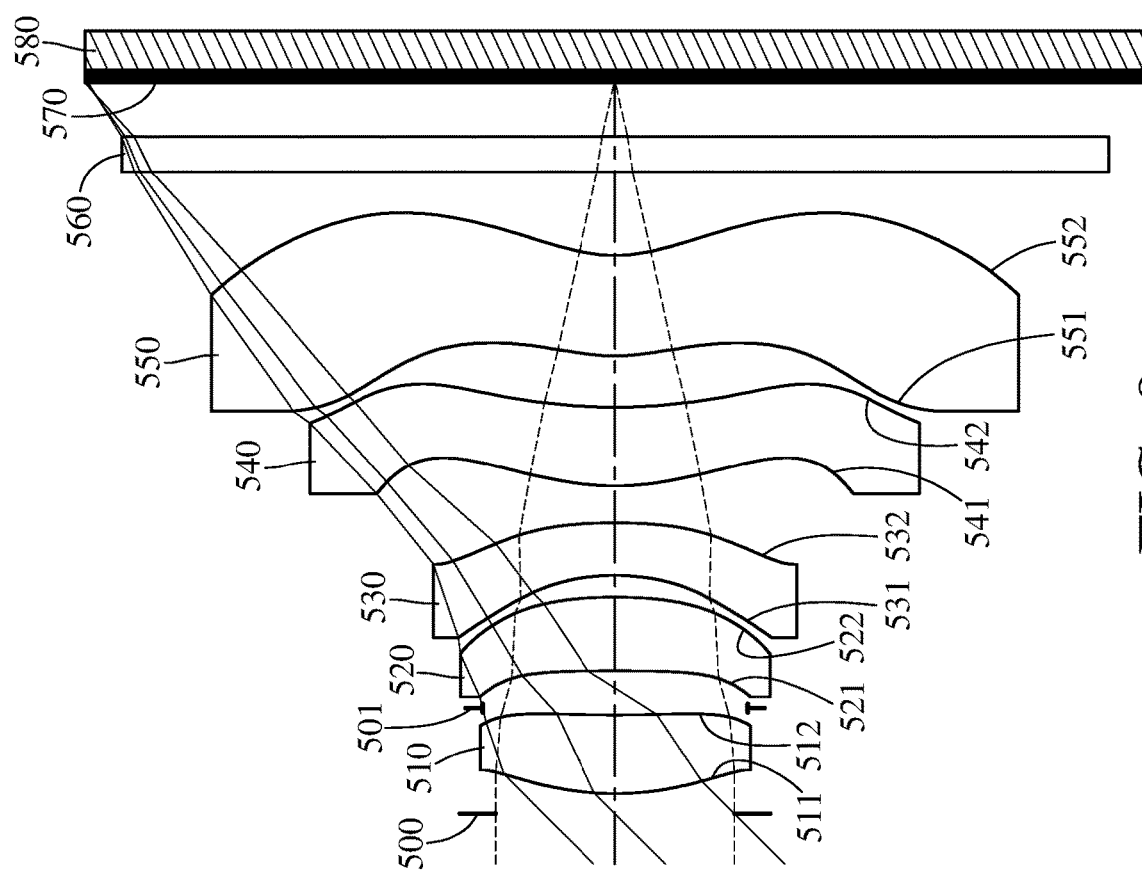
FIG. 9 is a schematic view of an image capturing unit according to the 5th embodiment of the present disclosure.
Figure 10:
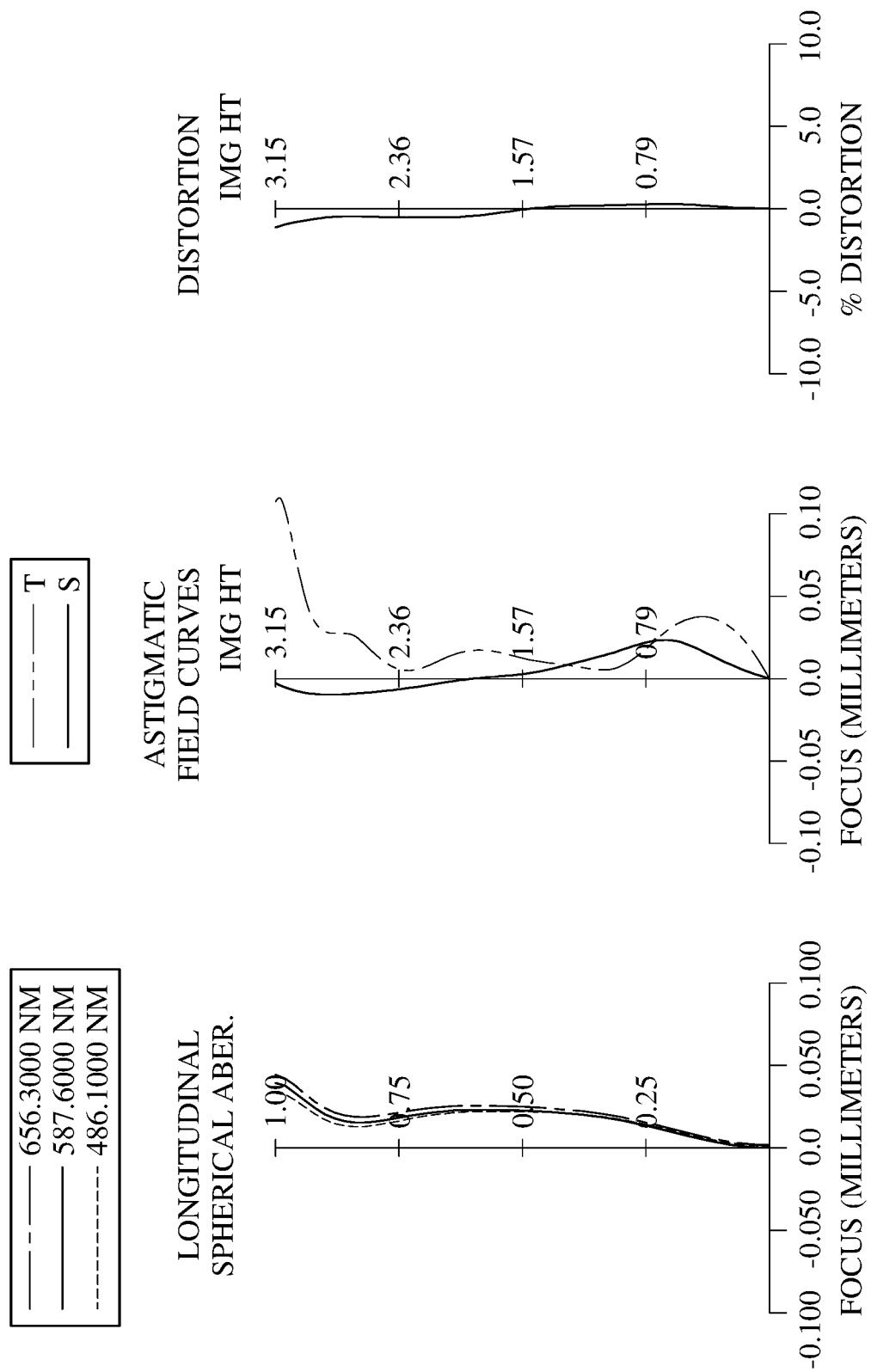
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the image lens assembly (its reference numeral is omitted) of the present disclosure and an image sensor 580. The image lens assembly includes, in order from an object side to an image side along an optical path, an aperture stop 500, a first lens element 510, a stop 501, a second lens element 520, a third lens element 530, a fourth lens element 540, a fifth lens element 550, a filter 560 and an image surface 570. The image lens assembly includes five lens elements (510, 520, 530, 540 and 550) with no additional lens element disposed between each of the adjacent five lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one concave critical point in an off-axis region thereof. The image-side surface 542 of the fourth lens element 540 has at least one convex critical point in an off-axis region thereof.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex critical point in an off-axis region thereof.

The filter 560 is made of glass material and located between the fifth lens element 550 and the image surface 570, and will not affect the focal length of the image lens assembly. The image sensor 580 is disposed on or near the image surface 570 of the image lens assembly.

The detailed optical data of the 5th embodiment are shown in Table 9 and the aspheric surface data are shown in Table 10 below.

TABLE 9

5th Embodiment
f = 3.17 mm, Fno = 2.23, HFOV = 45.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.120 | | | | |
| 2 | Lens 1 | 1.771 (ASP) | 0.471 | Plastic | 1.545 | 56.1 | 4.11 |
| 3 | | 7.651 (ASP) | 0.041 | | | | |
| 4 | Stop | Plano | 0.222 | | | | |
| 5 | Lens 2 | −19.528 (ASP) | 0.439 | Plastic | 1.544 | 56.0 | 5.75 |
| 6 | | −2.718 (ASP) | 0.130 | | | | |
| 7 | Lens 3 | −1.384 (ASP) | 0.312 | Plastic | 1.669 | 19.5 | −3.42 |
| 8 | | −3.820 (ASP) | 0.221 | | | | |
| 9 | Lens 4 | 1.543 (ASP) | 0.470 | Plastic | 1.566 | 37.4 | 5.96 |
| 10 | | 2.531 (ASP) | 0.307 | | | | |
| 11 | Lens 5 | 1.206 (ASP) | 0.598 | Plastic | 1.544 | 56.0 | −18.54 |
| 12 | | 0.889 (ASP) | 0.500 | | | | |
| 13 | Filter | Plano | 0.210 | Glass | 1.517 | 64.2 | — |
| 14 | | Plano | 0.319 | | | | |
| 15 | Image | Plano | 0.000 | | | | |

Note:
Reference wavelength is 587.6 nm (d-line).
An effective radius of the stop 501 (Surface 4) is 0.790 mm.

TABLE 10

Aspheric Coefficients

| Surface # | 2 | 3 | 5 | 6 | 7 |
|---|---|---|---|---|---|
| k = | 1.0430E+00 | −8.2178E+01 | 9.0000E+01 | −5.9775E+01 | −1.5584E+00 |
| A4 = | −8.2875E−02 | −1.1609E−01 | −1.3911E−01 | −5.3669E−01 | −3.4321E−01 |
| A6 = | 1.8449E−01 | 7.8620E−02 | −4.4293E−01 | 4.5487E−01 | −6.8192E−02 |
| A8 = | −1.1666E+00 | −1.0651E+00 | 1.1504E+00 | −5.4229E−01 | 1.6737E+00 |
| A10 = | 2.7635E+00 | 2.3038E+00 | −3.1015E+00 | 7.1698E−01 | −2.5706E+00 |
| A12 = | −3.5755E+00 | −2.9928E+00 | 3.3104E+00 | −6.2318E−01 | 1.6437E+00 |
| A14 = | 1.5269E+00 | 1.5259E+00 | −1.0638E+00 | 1.6791E−01 | −4.6547E−01 |
| A16 = | — | — | — | — | 4.5857E−02 |

TABLE 10-continued

| Aspheric Coefficients | | | | | |
|---|---|---|---|---|---|
| Surface # | 8 | 9 | 10 | 11 | 12 |
| k = | 1.9600E+00 | −1.9695E+01 | −9.0000E+01 | −1.0703E+01 | −5.1616E+00 |
| A4 = | −4.3131E−01 | 2.2401E−01 | 4.6367E−02 | −3.4530E−01 | −1.6423E−01 |
| A6 = | 5.2598E−01 | −6.0383E−01 | 2.6253E−01 | 3.1209E−01 | 1.2396E−01 |
| A8 = | −2.6034E−01 | 1.0607E+00 | −6.1048E−01 | −1.6294E−01 | −7.3084E−02 |
| A10 = | 1.1234E−01 | −1.4469E+00 | 5.7110E−01 | 4.6307E−03 | 2.7579E−02 |
| A12 = | −1.2091E−01 | 1.2888E+00 | −3.0651E−01 | 3.6748E−02 | −6.6814E−03 |
| A14 = | 8.8967E−02 | −7.1641E−01 | 9.9917E−02 | −1.7840E−02 | 1.0679E−03 |
| A16 = | −1.4529E−02 | 2.3624E−01 | −1.9302E−02 | 3.8430E−03 | −1.1230E−04 |
| A18 = | — | −4.1773E−02 | 2.0148E−03 | −4.0515E−04 | 7.1505E−06 |
| A20 = | — | 3.0243E−03 | −8.7071E−05 | 1.6958E−05 | −2.0731E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.17 | Td/EPD | 2.26 |
| Fno | 2.23 | ImgH/BL | 3.06 |
| HFOV [deg.] | 45.0 | (R1 + R4)/(R1 − R4) | −0.21 |
| FOV [deg.] | 90.0 | (R3 + R4)/(R3 − R4) | 1.32 |
| tan(HFOV) | 1.00 | (R7 + R8)/(R7 − R8) | −4.12 |
| V3 + V4 | 56.9 | (R9 + R10)/(R9 − R10) | 6.61 |
| V1/N1 | 36.30 | R2/R3 | −0.39 |
| V2/N2 | 36.26 | |R8/R7| | 1.64 |
| V3/N3 | 11.65 | f1/f2 | 0.72 |
| V4/N4 | 23.91 | |f3/f2| | 0.59 |
| V5/N5 | 36.26 | f/R5 | −2.29 |
| Vmin | 19.5 | (f/f4) − (f/f5) | 0.70 |

6th Embodiment

Figure 11:
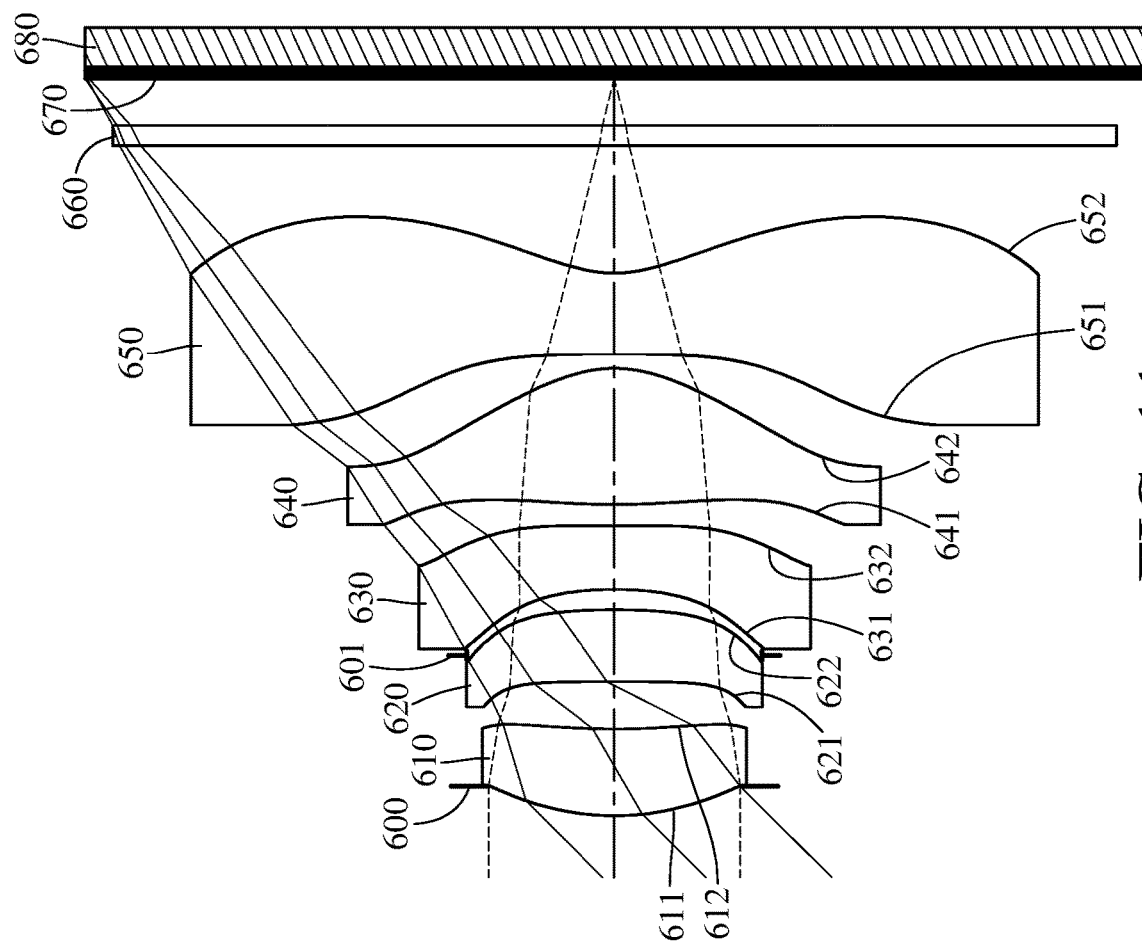
FIG. 11 is a schematic view of an image capturing unit according to the 6th embodiment of the present disclosure.
Figure 12:
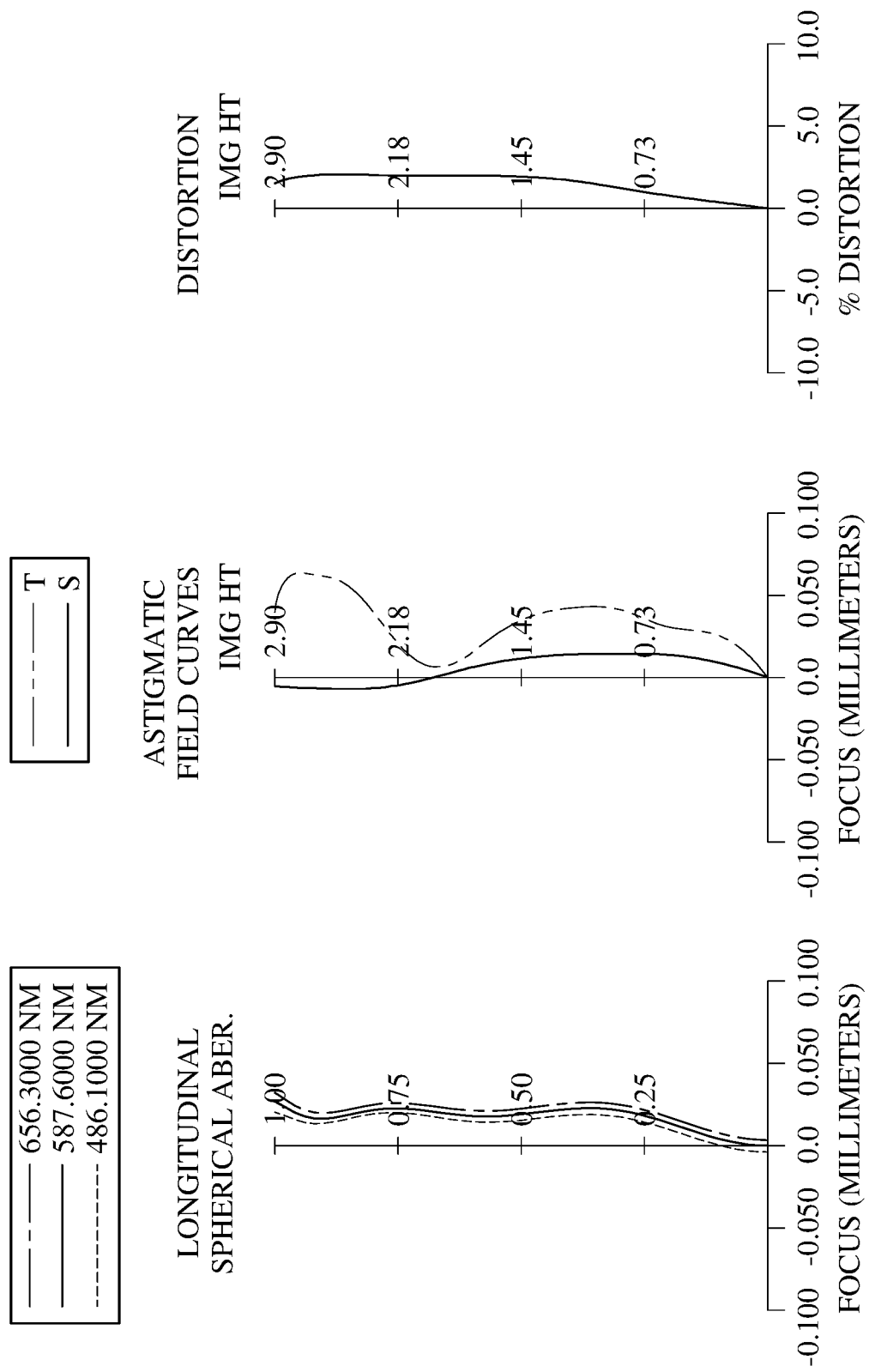
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the image lens assembly (its reference numeral is omitted) of the present disclosure and an image sensor 680. The image lens assembly includes, in order from an object side to an image side along an optical path, an aperture stop 600, a first lens element 610, a second lens element 620, a stop 601, a third lens element 630, a fourth lens element 640, a fifth lens element 650, a filter 660 and an image surface 670. The image lens assembly includes five lens elements (610, 620, 630, 640 and 650) with no additional lens element disposed between each of the adjacent five lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one concave critical point in an off-axis region thereof.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex critical point in an off-axis region thereof.

The filter 660 is made of glass material and located between the fifth lens element 650 and the image surface 670, and will not affect the focal length of the image lens assembly. The image sensor 680 is disposed on or near the image surface 670 of the image lens assembly.

The detailed optical data of the 6th embodiment are shown in Table 11 and the aspheric surface data are shown in Table 12 below.

TABLE 11

6th Embodiment
f = 2.83 mm, Fno = 2.05, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.161 | | | | |
| 2 | Lens 1 | 1.488 | (ASP) | 0.475 | Plastic | 1.545 | 56.1 | 3.93 |
| 3 | | 4.329 | (ASP) | 0.260 | | | | |
| 4 | Lens 2 | −166.518 | (ASP) | 0.398 | Plastic | 1.544 | 56.0 | 7.09 |
| 5 | | −3.771 | (ASP) | −0.255 | | | | |
| 6 | Stop | Plano | | 0.366 | | | | |
| 7 | Lens 3 | −1.991 | (ASP) | 0.348 | Plastic | 1.660 | 20.4 | −2.61 |
| 8 | | 13.612 | (ASP) | 0.118 | | | | |
| 9 | Lens 4 | 3.761 | (ASP) | 0.748 | Plastic | 1.529 | 45.4 | 1.16 |
| 10 | | −0.680 | (ASP) | 0.079 | | | | |
| 11 | Lens 5 | −17.847 | (ASP) | 0.446 | Plastic | 1.534 | 55.9 | −1.23 |
| 12 | | 0.690 | (ASP) | 0.700 | | | | |
| 13 | Filter | Plano | | 0.110 | Glass | 1.517 | 64.2 | — |
| 14 | | Plano | | 0.253 | | | | |
| 15 | Image | Plano | | 0.000 | | | | |

Note:
Reference wavelength is 587.6 nm (d-line).
An effective radius of the stop 601 (Surface 6) is 0.810 mm.

TABLE 12

Aspheric Coefficients

| Surface # | 2 | 3 | 4 | 5 | 7 |
|---|---|---|---|---|---|
| k = | −2.9118E+00 | −9.0000E+01 | −1.0000E+00 | −2.6567E+00 | 3.6561E+00 |
| A4 = | 1.0928E−01 | 1.0503E−01 | −2.3299E−01 | −1.7275E−01 | −2.2891E−01 |
| A6 = | 1.8549E−02 | −6.2183E−01 | 9.6441E−01 | −8.1675E−01 | −8.6549E−01 |
| A8 = | −3.8067E−01 | 1.3672E+00 | −9.6691E+00 | 1.4340E+00 | 3.1409E+00 |
| A10 = | 9.7302E−01 | −2.9434E+00 | 3.5419E+01 | −3.7219E+00 | −7.3572E+00 |
| A12 = | −1.0799E+00 | 1.7153E+00 | −6.7825E+01 | 5.0161E+00 | 1.1121E+01 |
| A14 = | — | — | 4.7599E+01 | −2.2217E+00 | −6.2525E+00 |

| Surface # | 8 | 9 | 10 | 11 | 12 |
|---|---|---|---|---|---|
| k = | −1.0000E+00 | −8.9899E+01 | −4.1676E+00 | −8.8463E+01 | −5.2906E+00 |
| A4 = | −4.0484E−01 | −5.6954E−02 | −2.2956E−01 | −9.3445E−02 | −1.2448E−01 |
| A6 = | 2.4461E−01 | 7.7280E−02 | 5.7144E−01 | −1.3534E−01 | 6.4389E−02 |
| A8 = | −3.2914E−01 | −4.6708E−01 | −8.3140E−01 | 1.6591E−01 | −2.5148E−02 |
| A10 = | 6.5580E−01 | 8.2301E−01 | 7.2145E−01 | −6.7090E−02 | 6.7609E−03 |
| A12 = | −5.9240E−01 | −7.1452E−01 | −3.4152E−01 | 1.2260E−02 | −1.1843E−03 |
| A14 = | 1.9922E−01 | 3.0629E−01 | 8.2151E−02 | −8.6561E−04 | 1.1989E−04 |
| A16 = | — | −5.0807E−02 | −7.9174E−03 | — | −5.3021E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

6th Embodiment

| f [mm] | 2.83 | Td/EPD | 2.16 |
|---|---|---|---|
| Fno | 2.05 | ImgH/BL | 2.73 |
| HFOV [deg.] | 45.1 | (R1 + R4)/(R1 − R4) | −0.43 |
| FOV [deg.] | 90.2 | (R3 + R4)/(R3 − R4) | 1.05 |
| tan(HFOV) | 1.00 | (R7 + R8)/(R7 − R8) | 0.69 |
| V3 + V4 | 65.8 | (R9 + R10)/(R9 − R10) | 0.93 |
| V1/N1 | 36.30 | R2/R3 | −0.03 |

-continued

6th Embodiment

| V2/N2 | 36.26 | |R8/R7| | 0.18 |
|---|---|---|---|
| V3/N3 | 12.29 | f1/f2 | 0.55 |
| V4/N4 | 29.68 | |f3/f2| | 0.37 |
| V5/N5 | 36.46 | f/R5 | −1.42 |
| Vmin | 20.4 | (f/f4) − (f/f5) | 4.75 |

7th Embodiment

Figure 13:
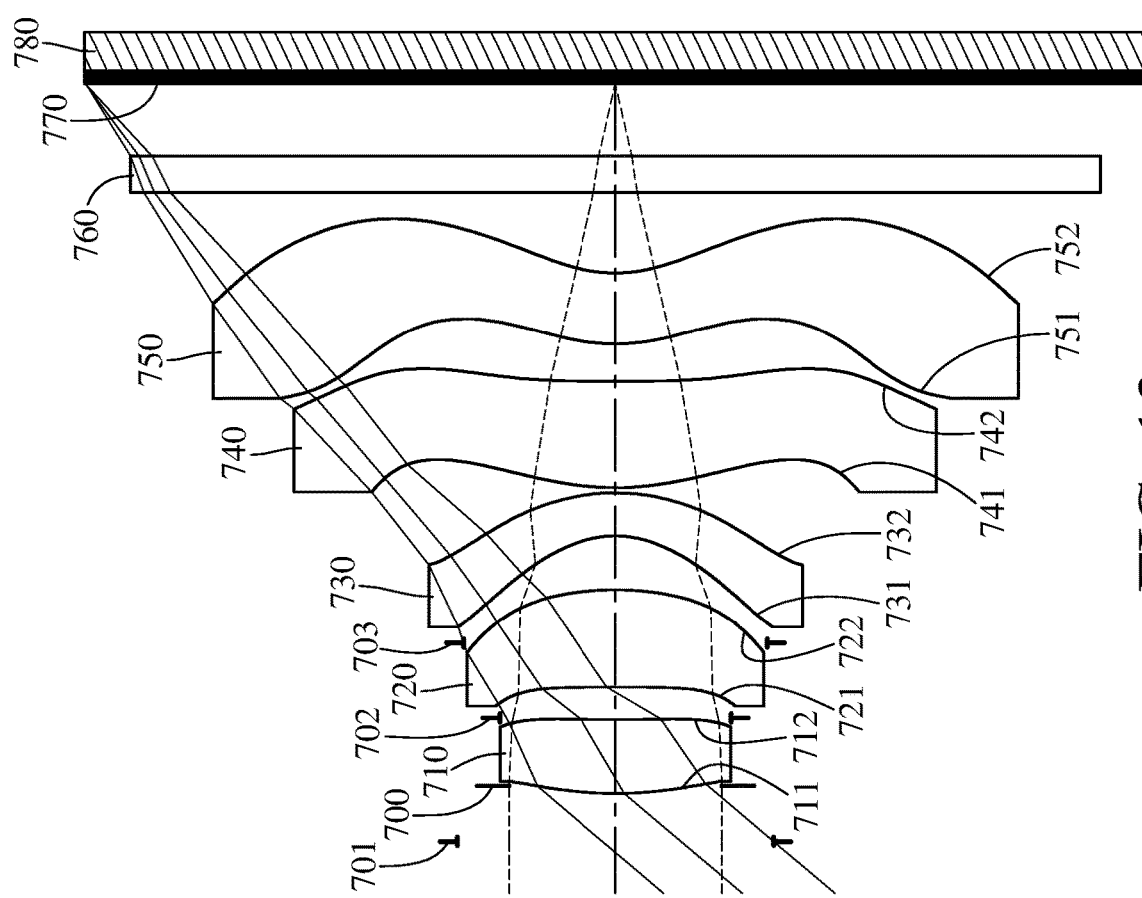
FIG. 13 is a schematic view of an image capturing unit according to the 7th embodiment of the present disclosure.
Figure 14:
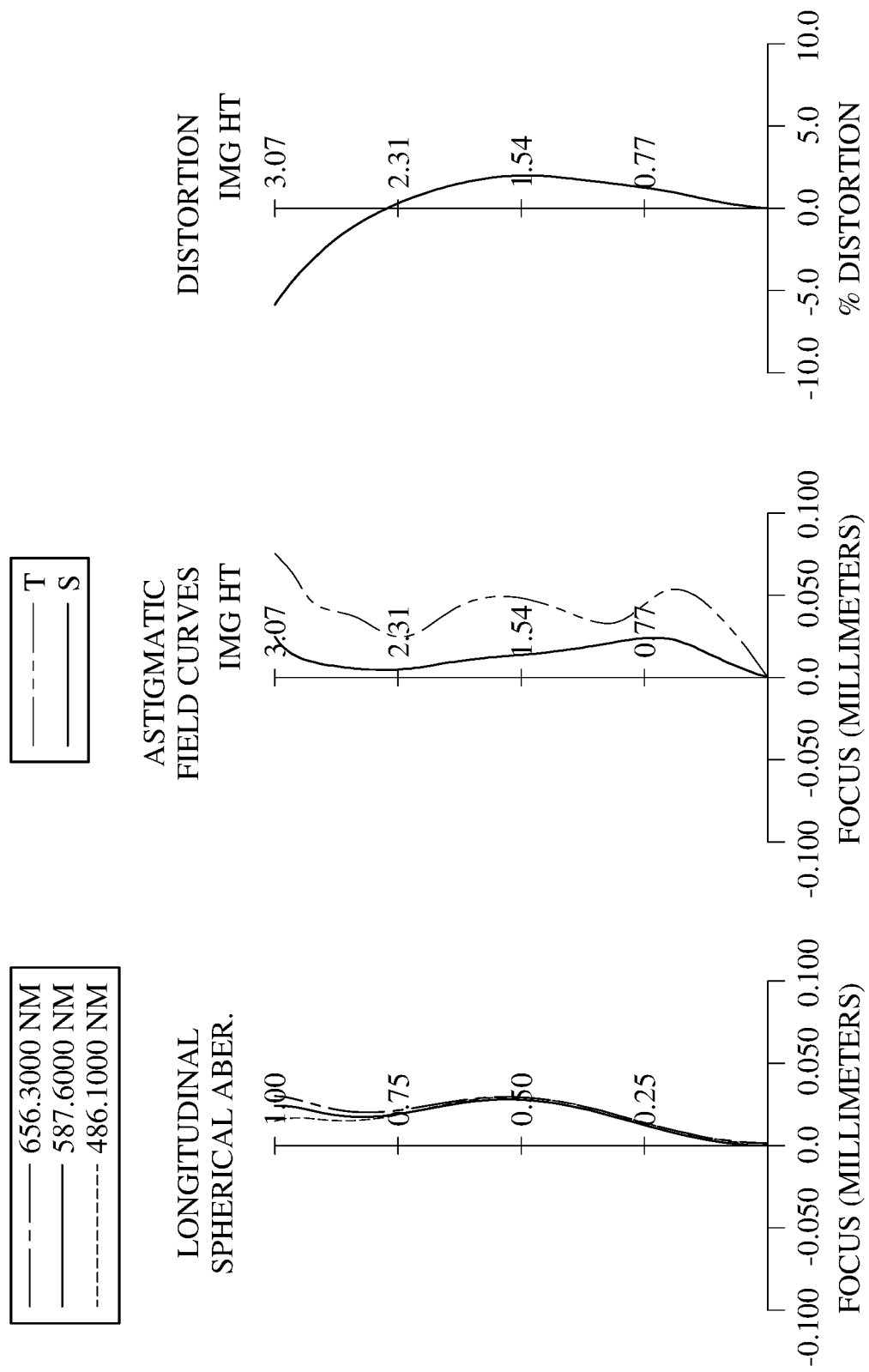
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the image lens assembly (its reference numeral is omitted) of the present disclosure and an image sensor 780. The image lens assembly includes, in order from an object side to an image side along an optical path, a stop 701, an aperture stop 700, a first lens element 710, a stop 702, a second lens element 720, a stop 703, a third lens element 730, a fourth lens element 740, a fifth lens element 750, a filter 760 and an image surface 770. The image lens assembly includes five lens elements (710, 720, 730, 740 and 750) with no additional lens element disposed between each of the adjacent five lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has at least one concave critical point in an off-axis region thereof. The image-side surface 742 of the fourth lens element 740 has at least one convex critical point in an off-axis region thereof.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex critical point in an off-axis region thereof.

The filter 760 is made of glass material and located between the fifth lens element 750 and the image surface 770, and will not affect the focal length of the image lens assembly. The image sensor 780 is disposed on or near the image surface 770 of the image lens assembly.

The detailed optical data of the 7th embodiment are shown in Table 13 and the aspheric surface data are shown in Table 14 below.

TABLE 13

7th Embodiment
f = 2.75 mm, Fno = 2.23, HFOV = 49.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 0.323 | | | | |
| 2 | Ape. Stop | Plano | | −0.045 | | | | |
| 3 | Lens 1 | 2.204 | (ASP) | 0.429 | Plastic | 1.545 | 56.1 | 5.21 |
| 4 | | 9.194 | (ASP) | 0.010 | | | | |
| 5 | Stop | Plano | | 0.178 | | | | |
| 6 | Lens 2 | −77.738 | (ASP) | 0.568 | Plastic | 1.545 | 56.1 | 3.31 |
| 7 | | −1.769 | (ASP) | −0.310 | | | | |
| 8 | Stop | Plano | | 0.623 | | | | |
| 9 | Lens 3 | −0.594 | (ASP) | 0.250 | Plastic | 1.669 | 19.5 | −2.20 |
| 10 | | −1.164 | (ASP) | 0.030 | | | | |
| 11 | Lens 4 | 1.628 | (ASP) | 0.618 | Plastic | 1.566 | 37.4 | 2.90 |
| 12 | | 200.000 | (ASP) | 0.216 | | | | |
| 13 | Lens 5 | 1.101 | (ASP) | 0.414 | Plastic | 1.534 | 55.9 | −13.23 |
| 14 | | 0.828 | (ASP) | 0.468 | | | | |
| 15 | Filter | Plano | | 0.210 | Glass | 1.517 | 64.2 | — |
| 16 | | Plano | | 0.419 | | | | |
| 17 | Image | Plano | | 0.000 | | | | |

Note:
Reference wavelength is 587.6 nm (d-line).
An effective radius of the stop 701 (Surface 1) is 0.917 mm.
An effective radius of the stop 702 (Surface 5) is 0.670 mm.
An effective radius of the stop 703 (Surface 8) is 0.880 mm.

TABLE 14

Aspheric Coefficients

| Surface # | 3 | 4 | 6 | 7 | 9 |
|---|---|---|---|---|---|
| k = | −4.9617E−01 | 1.1557E+01 | −7.0426E+01 | 9.2614E−01 | −9.3653E−01 |
| A4 = | −6.2152E−02 | −1.9493E−01 | −2.3349E−01 | −1.1193E−01 | 6.0116E−01 |
| A6 = | −1.3236E−01 | −3.1337E−01 | −2.9696E−01 | −3.4254E−01 | −9.3103E−01 |
| A8 = | 1.7683E−01 | 2.9483E−01 | −9.5374E−03 | 7.2539E−01 | −1.7956E+00 |
| A10 = | −5.2984E−01 | −1.1329E+00 | −1.5793E+00 | −2.2585E+00 | 1.1641E+01 |

TABLE 14-continued

| Aspheric Coefficients | | | | |
|---|---|---|---|---|
| A12 = | — | 1.0335E+00 | 1.8684E+00 | 4.5156E+00 | -2.1265E+01 |
| A14 = | — | — | — | -4.2567E+00 | 1.8933E+01 |
| A16 = | — | — | — | 1.4985E+00 | -8.2779E+00 |
| A18 = | — | — | — | — | 1.4012E+00 |

| Surface # | 10 | 11 | 12 | 13 | 14 |
|---|---|---|---|---|---|
| k = | -8.5734E-01 | -1.1120E+00 | 9.0000E+01 | -1.0552E+00 | -1.9045E+00 |
| A4 = | 1.6254E-01 | -1.6296E-01 | 2.4201E-01 | -4.3708E-01 | -3.7268E-01 |
| A6 = | -7.8611E-01 | 4.8686E-02 | -2.7816E-01 | 1.0473E-01 | 2.9810E-01 |
| A8 = | 1.6377E+00 | -2.8157E-02 | 1.1701E-01 | 1.3058E-01 | -1.7608E-01 |
| A10 = | -2.0120E+00 | -2.1166E-02 | 1.2036E-03 | -1.9696E-01 | 7.2609E-02 |
| A12 = | 2.2589E+00 | 4.5356E-02 | -2.7236E-02 | 1.2043E-01 | -2.0796E-02 |
| A14 = | -2.1138E+00 | -3.1266E-02 | 1.3830E-02 | -3.9533E-02 | 4.0878E-03 |
| A16 = | 1.1576E+00 | 9.0227E-03 | -3.2347E-03 | 7.2837E-03 | -5.2638E-04 |
| A18 = | -2.5179E-01 | -8.7833E-04 | 3.6766E-04 | -7.1236E-04 | 3.9702E-05 |
| A20 = | — | — | -1.6149E-05 | 2.8888E-05 | -1.3150E-06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.75 | Td/EPD | 2.45 |
| Fno | 2.23 | ImgH/BL | 2.80 |
| HFOV [deg.] | 49.7 | (R1 + R4)/(R1 - R4) | 0.11 |
| FOV [deg.] | 99.4 | (R3 + R4)/(R3 - R4) | 1.05 |
| tan(HFOV) | 1.18 | (R7 + R8)/(R7 - R8) | -1.02 |
| V3 + V4 | 56.9 | (R9 + R10)/(R9 - R10) | 7.06 |
| V1/N1 | 36.30 | R2/R3 | -0.12 |
| V2/N2 | 36.30 | |R8/R7| | 122.87 |
| V3/N3 | 11.65 | f1/f2 | 1.57 |
| V4/N4 | 23.91 | |f3/f2| | 0.66 |
| V5/N5 | 36.46 | f/R5 | -4.64 |
| Vmin | 19.5 | (f/f4) - (f/f5) | 1.16 |

8th Embodiment

Figure 15:
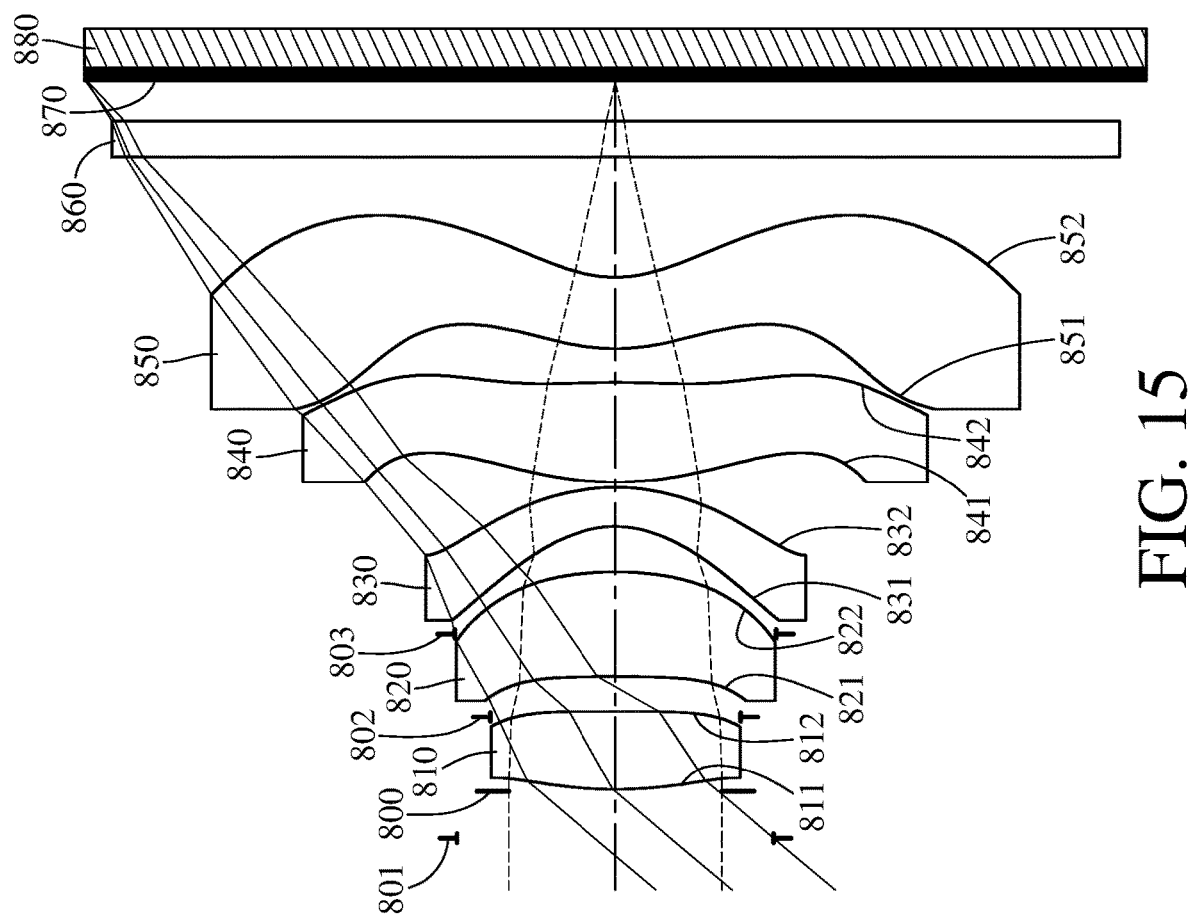
FIG. 15 is a schematic view of an image capturing unit according to the 8th embodiment of the present disclosure.
Figure 16:
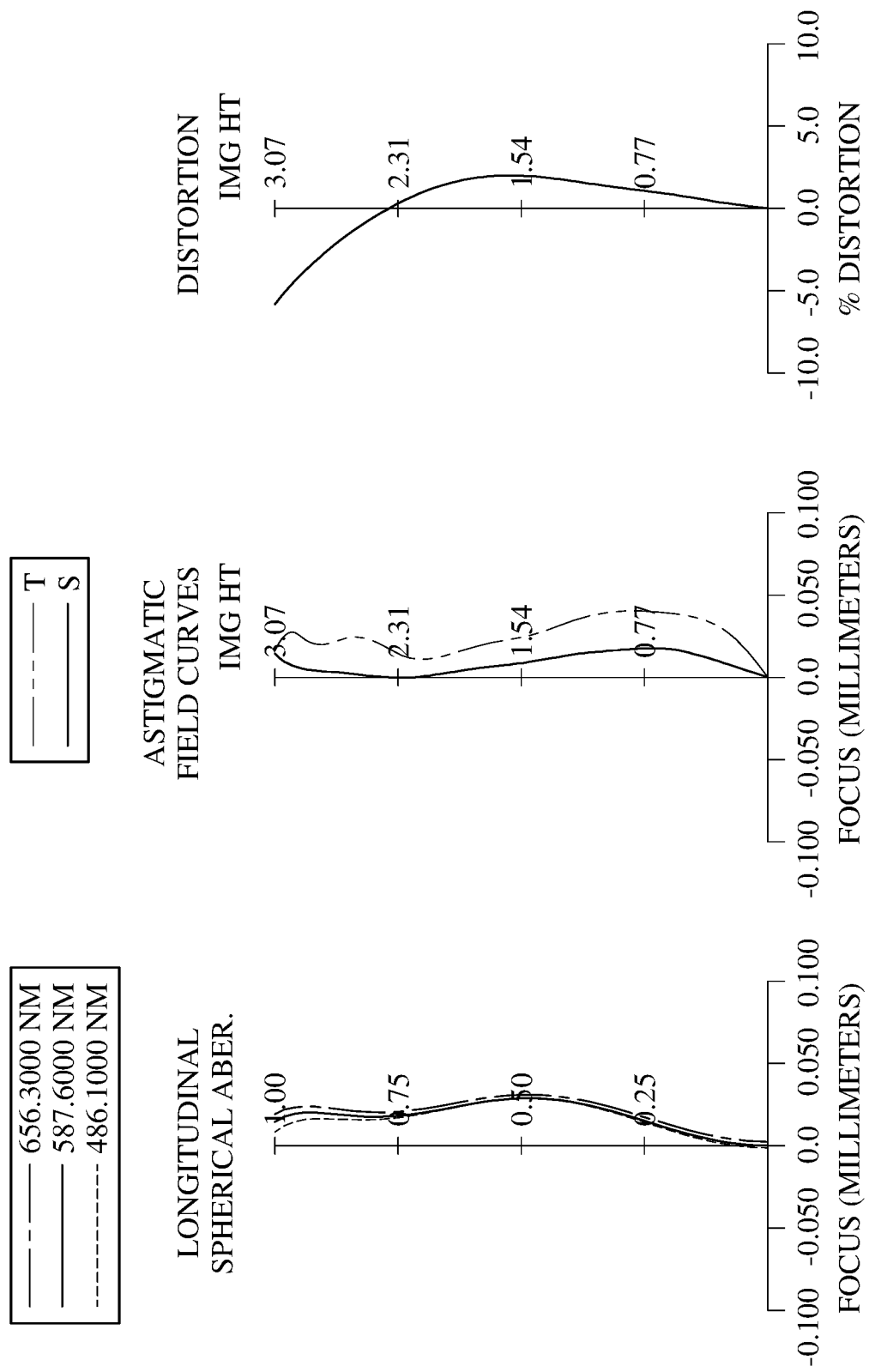
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the image lens assembly (its reference numeral is omitted) of the present disclosure and an image sensor 880. The image lens assembly includes, in order from an object side to an image side along an optical path, a stop 801, an aperture stop 800, a first lens element 810, a stop 802, a second lens element 820, a stop 803, a third lens element 830, a fourth lens element 840, a fifth lens element 850, a filter 860 and an image surface 870. The image lens assembly includes five lens elements (810, 820, 830, 840 and 850) with no additional lens element disposed between each of the adjacent five lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has at least one concave critical point in an off-axis region thereof. The image-side surface 842 of the fourth lens element 840 has at least one convex critical point in an off-axis region thereof.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex critical point in an off-axis region thereof.

The filter 860 is made of glass material and located between the fifth lens element 850 and the image surface 870, and will not affect the focal length of the image lens assembly. The image sensor 880 is disposed on or near the image surface 870 of the image lens assembly.

The detailed optical data of the 8th embodiment are shown in Table 15 and the aspheric surface data are shown in Table 16 below.

TABLE 15

8th Embodiment
f = 2.75 mm, Fno = 2.23, HFOV = 49.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 0.272 | | | | |
| 2 | Ape. Stop | Plano | | 0.012 | | | | |
| 3 | Lens 1 | 2.360 | (ASP) | 0.453 | Plastic | 1.545 | 56.1 | 4.43 |
| 4 | | 94.801 | (ASP) | −0.032 | | | | |
| 5 | Stop | Plano | | 0.236 | | | | |
| 6 | Lens 2 | −17.005 | (ASP) | 0.607 | Plastic | 1.545 | 56.1 | 3.91 |
| 7 | | −1.918 | (ASP) | −0.361 | | | | |
| 8 | Stop | Plano | | 0.623 | | | | |
| 9 | Lens 3 | −0.613 | (ASP) | 0.230 | Plastic | 1.669 | 19.5 | −2.32 |
| 10 | | −1.165 | (ASP) | 0.030 | | | | |
| 11 | Lens 4 | 1.955 | (ASP) | 0.580 | Plastic | 1.566 | 37.4 | 2.51 |
| 12 | | −4.637 | (ASP) | 0.194 | | | | |
| 13 | Lens 5 | 1.189 | (ASP) | 0.415 | Plastic | 1.534 | 55.9 | −5.94 |
| 14 | | 0.760 | (ASP) | 0.700 | | | | |
| 15 | Filter | Plano | | 0.210 | Glass | 1.517 | 64.2 | — |
| 16 | | Plano | | 0.232 | | | | |
| 17 | Image | Plano | | 0.000 | | | | |

Note:
Reference wavelength is 587.6 nm (d-line).
An effective radius of the stop 801 (Surface 1) is 0.918 mm.
An effective radius of the stop 802 (Surface 5) is 0.725 mm.
An effective radius of the stop 803 (Surface 8) is 0.932 mm.

TABLE 16

Aspheric Coefficients

| Surface # | 3 | 4 | 6 | 7 | 9 |
|---|---|---|---|---|---|
| k = | −1.1951E+00 | 9.0000E+01 | −9.0000E+01 | 1.5252E−01 | −9.3741E−01 |
| A4 = | −7.6165E−02 | −2.1772E−01 | −2.6718E−01 | −1.1097E−01 | 7.2753E−01 |
| A6 = | −4.4534E−02 | −2.3898E−01 | 2.4791E−02 | −3.1424E−01 | −1.6979E+00 |
| A8 = | −1.5740E−01 | 4.3545E−02 | −1.1928E+00 | 1.6404E−01 | 1.2034E+00 |
| A10 = | −1.3950E−01 | −3.0046E−02 | 1.8074E+00 | 1.3474E−01 | 4.0900E+00 |
| A12 = | — | — | 2.5273E−01 | 9.1245E−01 | −8.4489E+00 |
| A14 = | — | — | −1.6575E+00 | −1.9968E+00 | 4.3882E+00 |
| A16 = | — | — | — | 9.5976E−01 | 1.1497E+00 |
| A18 = | — | — | — | — | −1.1345E+00 |

| Surface # | 10 | 11 | 12 | 13 | 14 |
|---|---|---|---|---|---|
| k = | −9.9042E−01 | −2.5083E−01 | −5.7504E+01 | −1.0258E+00 | −2.0127E+00 |
| A4 = | 3.1039E−01 | −2.0149E−03 | 3.4441E−01 | −3.3919E−01 | −3.7149E−01 |
| A6 = | −1.2827E+00 | −3.3811E−01 | −3.2602E−01 | −1.1789E−01 | 3.2803E−01 |
| A8 = | 2.4634E+00 | 6.9030E−01 | 7.5301E−02 | 4.7470E−01 | −2.0946E−01 |
| A10 = | −2.4920E+00 | −9.9119E−01 | 5.5572E−02 | −5.2828E−01 | 9.1233E−02 |
| A12 = | 1.7835E+00 | 9.2158E−01 | −5.1663E−02 | 3.0706E−01 | −2.6841E−02 |
| A14 = | −1.2499E+00 | −5.3978E−01 | 1.8919E−02 | −1.0132E−01 | 5.2428E−03 |
| A16 = | 6.9664E−01 | 1.9068E−01 | −3.5532E−03 | 1.9165E−02 | −6.5020E−04 |
| A18 = | −1.6664E−01 | −3.7041E−02 | 3.1941E−04 | −1.9427E−03 | 4.6160E−05 |
| A20 = | — | 3.0400E−03 | −9.7787E−06 | 8.2023E−05 | −1.4205E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.75 | Td/EPD | 2.41 |
| Fno | 2.23 | ImgH/BL | 2.69 |
| HFOV [deg.] | 49.7 | (R1 + R4)/(R1 − R4) | 0.10 |
| FOV [deg.] | 99.4 | (R3 + R4)/(R3 − R4) | 1.25 |
| tan(HFOV) | 1.18 | (R7 + R8)/(R7 − R8) | −0.41 |
| V3 + V4 | 56.9 | (R9 + R10)/(R9 − R10) | 4.54 |
| V1/N1 | 36.30 | R2/R3 | −5.57 |
| V2/N2 | 36.30 | |R8/R7| | 2.37 |
| V3/N3 | 11.65 | f1/f2 | 1.13 |
| V4/N4 | 23.91 | |f3/f2| | 0.59 |
| V5/N5 | 36.46 | f/R5 | −4.49 |
| Vmin | 19.5 | (f/f4) − (f/f5) | 1.56 |

9th Embodiment

Figure 17:
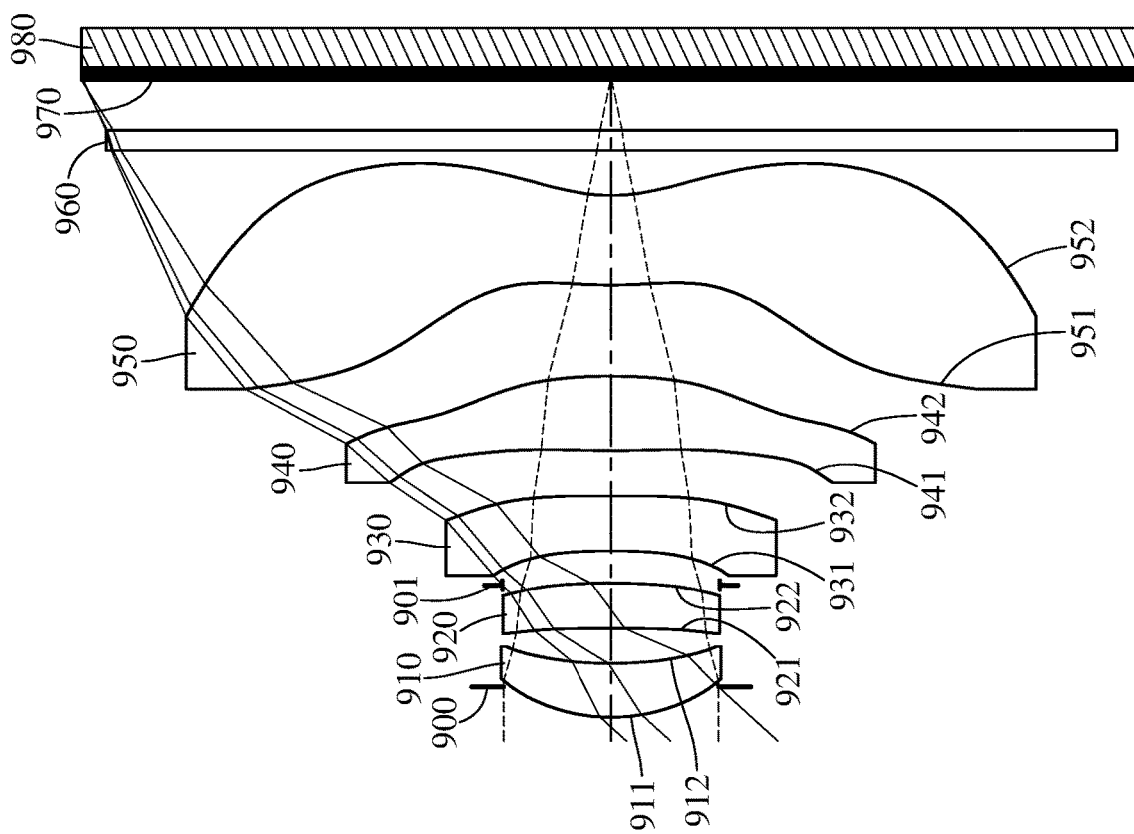
FIG. 17 is a schematic view of an image capturing unit according to the 9th embodiment of the present disclosure.
Figure 18:
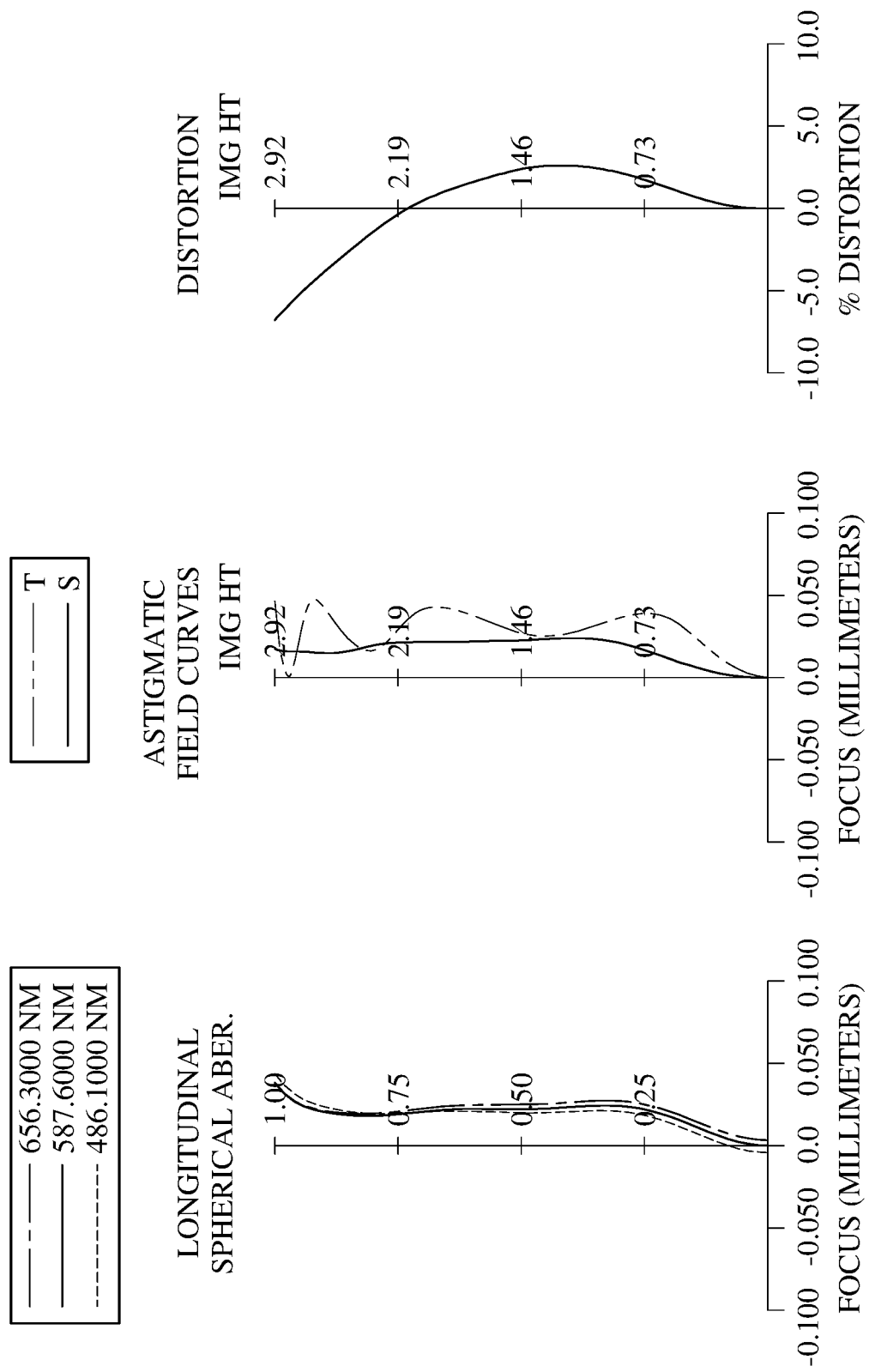
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the image lens assembly (its reference numeral is omitted) of the present disclosure and an image sensor 980. The image lens assembly includes, in order from an object side to an image side along an optical path, an aperture stop 900, a first lens element 910, a second lens element 920, a stop 901, a third lens element 930, a fourth lens element 940, a fifth lens element 950, a filter 960 and an image surface 970. The image lens assembly includes five lens elements (910, 920, 930, 940 and 950) with no additional lens element disposed between each of the adjacent five lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one concave critical point in an off-axis region thereof.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex critical point in an off-axis region thereof.

The filter 960 is made of glass material and located between the fifth lens element 950 and the image surface 970, and will not affect the focal length of the image lens assembly. The image sensor 980 is disposed on or near the image surface 970 of the image lens assembly.

The detailed optical data of the 9th embodiment are shown in Table 17 and the aspheric surface data are shown in Table 18 below.

TABLE 17

9th Embodiment
f = 2.82 mm, Fno = 2.40, HFOV = 47.6 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.167 | | | | |
| 2 | Lens 1 | 1.039 | (ASP) | 0.297 | Plastic | 1.544 | 56.0 | 3.36 |
| 3 | | 2.168 | (ASP) | 0.194 | | | | |
| 4 | Lens 2 | −14.032 | (ASP) | 0.252 | Plastic | 1.544 | 56.0 | 10.56 |
| 5 | | −4.102 | (ASP) | −0.012 | | | | |
| 6 | Stop | Plano | | 0.189 | | | | |
| 7 | Lens 3 | −4.235 | (ASP) | 0.305 | Plastic | 1.705 | 14.0 | −5.61 |
| 8 | | 60.964 | (ASP) | 0.250 | | | | |
| 9 | Lens 4 | 5.479 | (ASP) | 0.411 | Plastic | 1.566 | 37.4 | 3.88 |
| 10 | | −3.562 | (ASP) | 0.507 | | | | |
| 11 | Lens 5 | 2.476 | (ASP) | 0.494 | Plastic | 1.550 | 50.0 | −3.13 |
| 12 | | 0.944 | (ASP) | 0.250 | | | | |
| 13 | Filter | Plano | | 0.110 | Glass | 1.517 | 64.2 | — |
| 14 | | Plano | | 0.277 | | | | |
| 15 | Image | Plano | | 0.000 | | | | |

Note:
Reference wavelength is 587.6 nm (d-line).
An effective radius of the stop 901 (Surface 6) is 0.600 mm.

TABLE 18

| Aspheric Coefficients | | | | | |
|---|---|---|---|---|---|
| Surface # | 2 | 3 | 4 | 5 | 7 |
| k = | −1.1197E+01 | 0.0000E+00 | 0.0000E+00 | 0.0000E+00 | 0.0000E+00 |
| A4 = | 1.2531E+00 | 5.1316E−02 | −1.7054E−01 | −1.6746E−01 | −6.1553E−01 |
| A6 = | −4.0590E+00 | 4.1429E−01 | 2.6972E−01 | −3.7239E+00 | 1.5485E+00 |
| A8 = | 1.4646E+01 | −4.6435E+00 | −4.7899E+00 | 6.8214E+01 | −7.8583E+00 |
| A10 = | −3.4418E+01 | 3.2379E+01 | 2.9818E+01 | −6.9368E+02 | 2.5508E+01 |
| A12 = | 4.6549E+01 | −1.1233E+02 | −9.1919E+01 | 4.2454E+03 | −6.1822E+01 |
| A14 = | −2.3286E+01 | 1.8386E+02 | 1.3636E+02 | −1.5966E+04 | 1.4019E+02 |
| A16 = | — | −7.9159E+01 | −4.9477E+01 | 3.6188E+04 | −3.0764E+02 |
| A18 = | — | — | — | −4.5321E+04 | 4.8228E+02 |
| A20 = | — | — | — | 2.4102E+04 | −3.6207E+02 |
| Surface # | 8 | 9 | 10 | 11 | 12 |
| k = | 0.0000E+00 | 0.0000E+00 | 4.1397E+00 | 0.0000E+00 | −4.4110E+00 |
| A4 = | −5.6837E−01 | −5.0917E−01 | −4.3761E−01 | −8.7377E−01 | −3.1580E−01 |
| A6 = | 1.5768E+00 | 1.1734E+00 | 9.1711E−01 | 5.4455E−01 | 2.7888E−01 |
| A8 = | −5.0209E+00 | −3.0171E+00 | −1.8840E+00 | −6.1818E−02 | −1.6780E−01 |
| A10 = | 1.3967E+01 | 7.1499E+00 | 3.2997E+00 | −8.2990E−02 | 6.5399E−02 |
| A12 = | −3.2221E+01 | −1.1810E+01 | −3.4552E+00 | 4.9013E−02 | −1.6128E−02 |
| A14 = | 5.5209E+01 | 1.2400E+01 | 2.1030E+00 | −1.3113E−02 | 2.3903E−03 |
| A16 = | −6.1193E+01 | −7.8988E+00 | −7.4182E−01 | 1.9524E−03 | −1.9237E−04 |
| A18 = | 3.8086E+01 | 2.7666E+00 | 1.4147E−01 | −1.5680E−04 | 6.3662E−06 |
| A20 = | −1.0029E+01 | −4.0604E−01 | −1.1304E−02 | 5.3175E−06 | 5.7088E−09 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.82 | Td/EPD | 2.43 |
| Fno | 2.40 | ImgH/BL | 4.59 |
| HFOV [deg.] | 47.6 | (R1 + R4)/(R1 − R4) | −0.60 |
| FOV [deg.] | 95.2 | (R3 + R4)/(R3 − R4) | 1.83 |
| tan(HFOV) | 1.10 | (R7 + R8)/(R7 − R8) | 0.21 |
| V3 + V4 | 51.4 | (R9 + R10)/(R9 − R10) | 2.23 |
| V1/N1 | 36.26 | R2/R3 | −0.15 |
| V2/N2 | 36.26 | |R8/R7| | 0.65 |
| V3/N3 | 8.21 | f1/f2 | 0.32 |
| V4/N4 | 23.91 | |f3/f2| | 0.53 |
| V5/N5 | 32.26 | f/R5 | −0.67 |
| Vmin | 14.0 | (f/f4) − (f/f5) | 1.63 |

10th Embodiment

Figure 19:
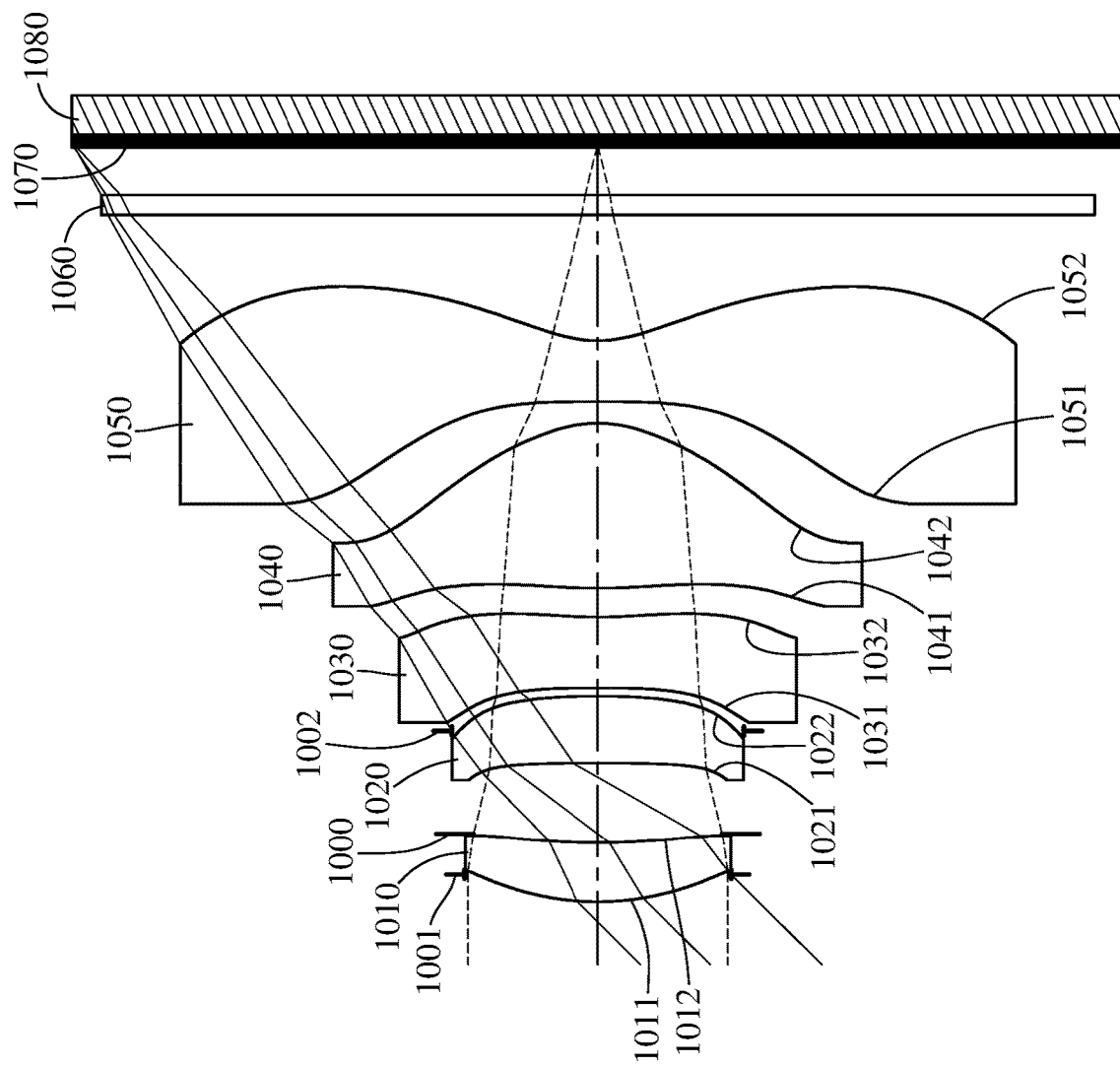
FIG. 19 is a schematic view of an image capturing unit according to the 10th embodiment of the present disclosure.
Figure 20:
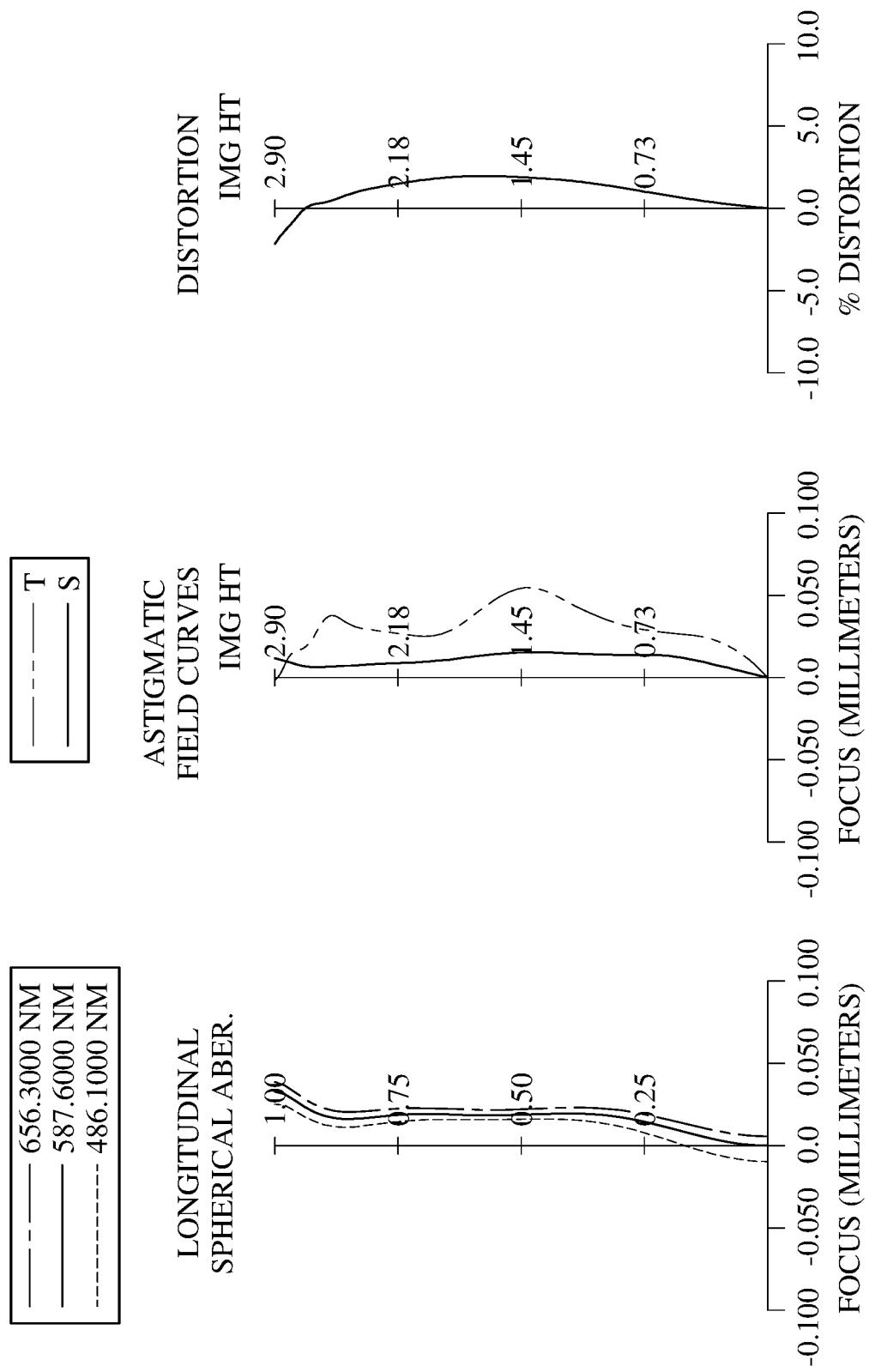
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the image lens assembly (its reference numeral is omitted) of the present disclosure and an image sensor 1080. The image lens assembly includes, in order from an object side to an image side along an optical path, a stop 1001, a first lens element 1010, an aperture stop 1000, a second lens element 1020, a stop 1002, a third lens element 1030, a fourth lens element 1040, a fifth lens element 1050, a filter 1060 and an image surface 1070. The image lens assembly includes five lens elements (1010, 1020, 1030, 1040 and 1050) with no additional lens element disposed between each of the adjacent five lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with positive refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric. The object-side surface 1041 of the fourth lens element 1040 has at least one concave critical point in an off-axis region thereof.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one convex critical point in an off-axis region thereof.

The filter 1060 is made of glass material and located between the fifth lens element 1050 and the image surface 1070, and will not affect the focal length of the image lens assembly. The image sensor 1080 is disposed on or near the image surface 1070 of the image lens assembly.

The detailed optical data of the 10th embodiment are shown in Table 19 and the aspheric surface data are shown in Table 20 below.

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

TABLE 19

10th Embodiment
f = 2.95 mm, Fno = 2.05, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.152 | | | | |
| 2 | Lens 1 | 1.540 | (ASP) | 0.329 | Plastic | 1.544 | 56.0 | 4.27 |
| 3 | | 4.229 | (ASP) | 0.049 | | | | |
| 4 | Ape. Stop | Plano | | 0.393 | | | | |
| 5 | Lens 2 | −17.944 | (ASP) | 0.370 | Plastic | 1.544 | 56.0 | 19.56 |
| 6 | | −6.728 | (ASP) | −0.192 | | | | |
| 7 | Stop | Plano | | 0.237 | | | | |
| 8 | Lens 3 | 98.701 | (ASP) | 0.394 | Plastic | 1.686 | 18.4 | −3.79 |
| 9 | | 2.530 | (ASP) | 0.160 | | | | |
| 10 | Lens 4 | 3.162 | (ASP) | 0.918 | Plastic | 1.529 | 45.4 | 1.14 |
| 11 | | −0.670 | (ASP) | 0.120 | | | | |
| 12 | Lens 5 | −9.881 | (ASP) | 0.337 | Plastic | 1.530 | 55.8 | −1.15 |
| 13 | | 0.654 | (ASP) | 0.700 | | | | |
| 14 | Filter | Plano | | 0.110 | Glass | 1.517 | 64.2 | — |
| 15 | | Plano | | 0.264 | | | | |
| 16 | Image | Plano | | 0.000 | | | | |

Note:
Reference wavelength is 587.6 nm (d-line).
An effective radius of the stop 1001 (Surface 1) is 0.740 mm.
An effective radius of the stop 1002 (Surface 7) is 0.810 mm.

TABLE 20

Aspheric Coefficients

| Surface # | 2 | 3 | 5 | 6 | 8 |
|---|---|---|---|---|---|
| k = | −2.5980E+00 | −3.4960E+01 | 0.0000E+00 | −2.2123E+01 | 9.0000E+01 |
| A4 = | 8.1846E−02 | 4.4827E−02 | −1.0586E−01 | −8.1995E−01 | −1.0644E+00 |
| A6 = | 7.1405E−02 | −1.1634E−01 | 4.1051E−01 | 4.1324E+00 | 3.9485E+00 |
| A8 = | −4.4623E−01 | −2.9821E−02 | −4.0869E+00 | −1.3462E+01 | −9.4425E+00 |
| A10 = | 9.0034E−01 | −2.5757E−02 | 1.2018E+01 | 2.0328E+01 | 9.1059E+00 |
| A12 = | −9.2495E−01 | −3.4279E−01 | −1.8424E+01 | −1.5637E+01 | −1.4754E+00 |
| A14 = | — | — | 9.0924E+00 | 5.0399E+00 | −1.4002E+00 |

| Surface # | 9 | 10 | 11 | 12 | 13 |
|---|---|---|---|---|---|
| k = | −1.0000E+00 | −8.7008E+01 | −4.0528E+00 | 0.0000E+00 | −4.9463E+00 |
| A4 = | −7.4242E−01 | −5.8699E−02 | −1.3546E−01 | −8.7165E−02 | −1.9159E−01 |
| A6 = | 1.4147E+00 | −4.6023E−01 | −6.5591E−02 | −5.9621E−01 | 1.4298E−01 |
| A8 = | −1.9946E+00 | 1.2502E+00 | 1.3555E−01 | 1.2325E+00 | −7.1729E−02 |
| A10 = | 1.5725E+00 | −1.5863E+00 | −3.1827E−02 | −1.2087E+00 | 2.3892E−02 |
| A12 = | −6.5126E−01 | 1.0539E+00 | −4.5697E−03 | 7.0027E−01 | −5.4095E−03 |
| A14 = | 1.2262E−01 | −3.4933E−01 | 8.0151E−04 | −2.4839E−01 | 8.2570E−04 |
| A16 = | — | 4.5784E−02 | 2.3706E−04 | 5.2929E−02 | −8.1080E−05 |
| A18 = | — | — | — | −6.2292E−03 | 4.5640E−06 |
| A20 = | — | — | — | 3.1163E−04 | −1.0915E−07 |

Moreover, these parameters can be calculated from Table 19 and Table 20 as the following values and satisfy the following conditions:

| 10th Embodiment | | | |
|---|---|---|---|
| f [mm] | 2.95 | Td/EPD | 2.16 |
| Fno | 2.05 | ImgH/BL | 2.70 |
| HFOV [deg.] | 45.0 | (R1 + R4)/(R1 − R4) | −0.63 |
| FOV [deg.] | 90.0 | (R3 + R4)/(R3 − R4) | 2.20 |
| tan(HFOV) | 1.00 | (R7 + R8)/(R7 − R8) | 0.65 |
| V3 + V4 | 63.8 | (R9 + R10)/(R9 − R10) | 0.88 |
| V1/N1 | 36.26 | R2/R3 | −0.24 |
| V2/N2 | 36.26 | |R8/R7| | 0.21 |
| V3/N3 | 10.90 | f1/f2 | 0.22 |
| V4/N4 | 29.68 | |f3/f2| | 0.19 |
| V5/N5 | 36.45 | f/R5 | 0.03 |
| Vmin | 18.4 | (f/f4) − (f/f5) | 5.17 |

11th Embodiment

Figure 21:
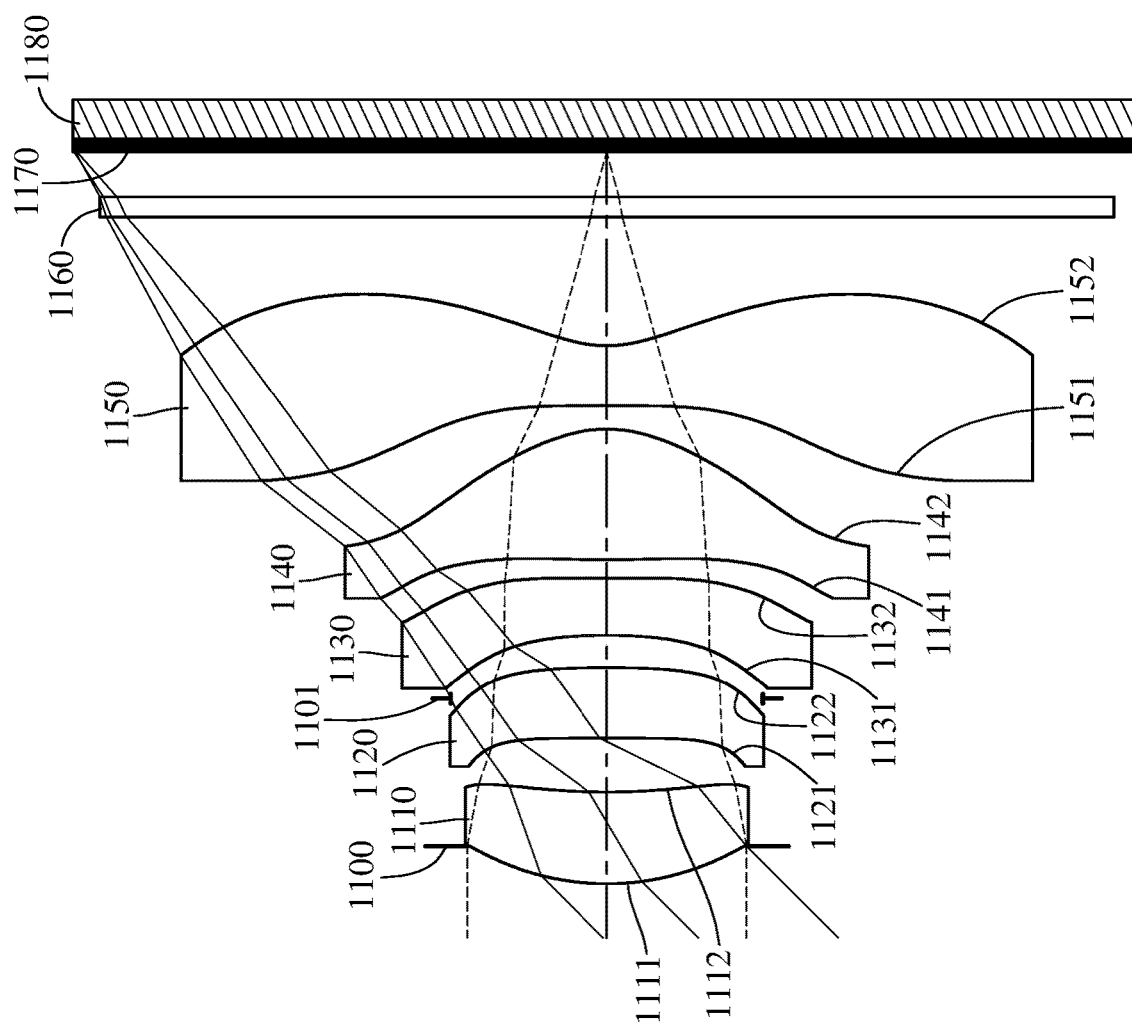
FIG. 21 is a schematic view of an image capturing unit according to the 11th embodiment of the present disclosure.
Figure 22:
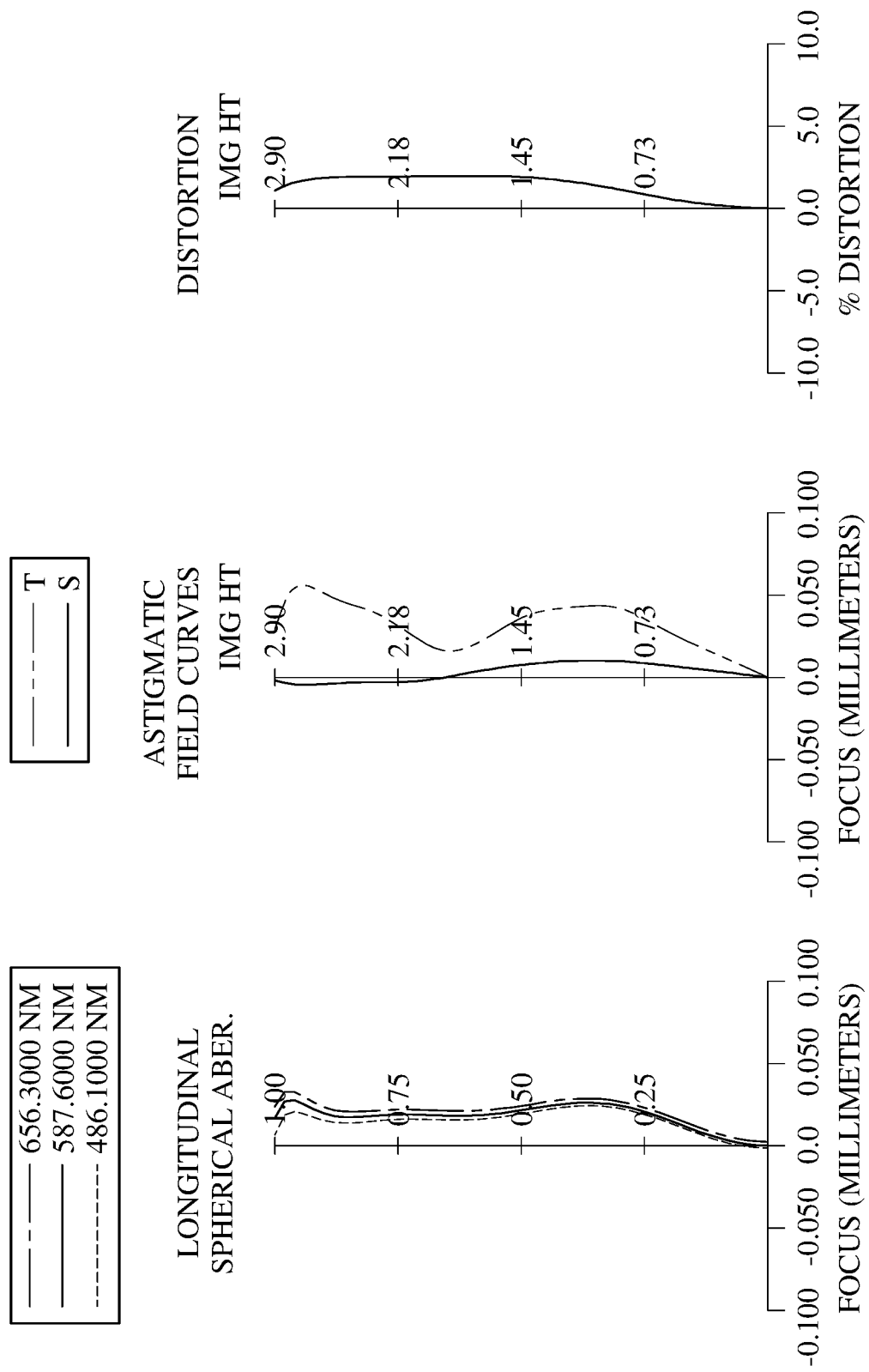
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the image lens assembly (its reference numeral is omitted) of the present disclosure and an image sensor 1180. The image lens assembly includes, in order from an object side to an image side along an optical path, an aperture stop 1100, a first lens element 1110, a second lens element 1120, a stop 1101, a third lens element 1130, a fourth lens element 1140, a fifth lens element 1150, a filter 1160 and an image surface 1170. The image lens assembly includes five lens elements (1110, 1120, 1130, 1140 and 1150) with no additional lens element disposed between each of the adjacent five lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with positive refractive power has an object-side surface 1121 being convex in a paraxial region thereof and an image-side surface 1122 being convex in a paraxial region thereof. The second lens element 1120 is made of plastic material and has the object-side surface 1121 and the image-side surface 1122 being both aspheric.

The third lens element 1130 with negative refractive power has an object-side surface 1131 being concave in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric. The object-side surface 1141 of the fourth lens element 1140 has at least one concave critical point in an off-axis region thereof.

The fifth lens element 1150 with negative refractive power has an object-side surface 1151 being concave in a paraxial region thereof and an image-side surface 1152 being concave in a paraxial region thereof. The fifth lens element 1150 is made of plastic material and has the object-side surface 1151 and the image-side surface 1152 being both aspheric. The image-side surface 1152 of the fifth lens element 1150 has at least one convex critical point in an off-axis region thereof.

The filter 1160 is made of glass material and located between the fifth lens element 1150 and the image surface 1170, and will not affect the focal length of the image lens assembly. The image sensor 1180 is disposed on or near the image surface 1170 of the image lens assembly.

The detailed optical data of the 11th embodiment are shown in Table 21 and the aspheric surface data are shown in Table 22 below.

TABLE 21

11th Embodiment
f = 2.86 mm, Fno = 1.88, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.205 | | | | |
| 2 | Lens 1 | 1.449 | (ASP) | 0.499 | Plastic | 1.544 | 56.0 | 4.06 |
| 3 | | 3.710 | (ASP) | 0.293 | | | | |
| 4 | Lens 2 | 90.621 | (ASP) | 0.387 | Plastic | 1.544 | 56.0 | 11.22 |
| 5 | | −6.536 | (ASP) | −0.171 | | | | |
| 6 | Stop | Plano | | 0.347 | | | | |
| 7 | Lens 3 | −3.125 | (ASP) | 0.311 | Plastic | 1.705 | 14.0 | −3.48 |
| 8 | | 11.926 | (ASP) | 0.101 | | | | |
| 9 | Lens 4 | 6.022 | (ASP) | 0.712 | Plastic | 1.559 | 40.4 | 1.16 |
| 10 | | −0.693 | (ASP) | 0.127 | | | | |
| 11 | Lens 5 | −232.249 | (ASP) | 0.330 | Plastic | 1.544 | 56.0 | −1.22 |
| 12 | | 0.668 | (ASP) | 0.700 | | | | |
| 13 | Filter | Plano | | 0.110 | Glass | 1.517 | 64.2 | — |
| 14 | | Plano | | 0.246 | | | | |
| 15 | Image | Plano | | 0.000 | | | | |

Note:
Reference wavelength is 587.6 nm (d-line).
An effective radius of the stop 1101 (Surface 6) is 0.850 mm.

TABLE 22

| Aspheric Coefficients | | | | | |
|---|---|---|---|---|---|
| Surface # | 2 | 3 | 4 | 5 | 7 |
| k = | −2.0193E+00 | −2.9792E+01 | 0.0000E+00 | −9.0000E+01 | 4.3558E+00 |
| A4 = | 7.3002E−02 | 5.8687E−02 | −2.3450E−01 | −2.2391E−01 | −2.6728E−01 |
| A6 = | 1.1309E−01 | −2.3432E−01 | 6.8309E−01 | −2.8572E−01 | −3.3203E−01 |
| A8 = | −4.5595E−01 | 3.0653E−01 | −5.8317E+00 | 5.3560E−01 | 2.1760E+00 |
| A10 = | 8.2118E−01 | −6.9312E−01 | 1.8027E+01 | −2.3826E+00 | −6.7983E+00 |
| A12 = | −6.5047E−01 | 6.6106E−02 | −3.0382E+01 | 3.4024E+00 | 9.5258E+00 |
| A14 = | — | — | 1.8695E+01 | −1.4939E+00 | −4.6761E+00 |
| Surface # | 8 | 9 | 10 | 11 | 12 |
| k = | −1.0000E+00 | 4.9311E−03 | −4.3065E+00 | 0.0000E+00 | −5.2822E+00 |
| A4 = | −4.3563E−01 | −3.3079E−01 | −2.9550E−01 | −2.4055E−01 | −1.8370E−01 |
| A6 = | 4.5522E−01 | 5.0955E−01 | 5.3001E−01 | 7.6282E−01 | 1.4852E−01 |
| A8 = | −3.7603E−01 | −9.8686E−01 | −8.6487E−01 | 1.8613E−02 | −9.4476E−02 |
| A10 = | 8.4752E−02 | 1.4264E+00 | 9.2490E−01 | −2.4161E−03 | 4.3165E−02 |
| A12 = | 7.9352E−02 | −1.2702E+00 | −5.2109E−01 | −9.5933E−03 | −1.3591E−02 |
| A14 = | −3.0864E−02 | 5.8679E−01 | 1.4490E−01 | 5.1562E−03 | 2.8355E−03 |
| A16 = | — | −1.0542E−01 | −1.5839E−02 | −1.1769E−03 | −3.7156E−04 |
| A18 = | — | — | — | 1.3106E−04 | 2.7569E−05 |
| A20 = | — | — | — | −5.8592E−06 | −8.8152E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 2.86 | Td/EPD | 1.93 |
| Fno | 1.88 | ImgH/BL | 2.75 |
| HFOV [deg.] | 45.0 | (R1 + R4)/(R1 − R4) | −0.64 |
| FOV [deg.] | 90.0 | (R3 + R4)/(R3 − R4) | 0.87 |
| tan(HFOV) | 1.00 | (R7 + R8)/(R7 − R8) | 0.79 |
| V3 + V4 | 54.4 | (R9 + R10)/(R9 − R10) | 0.99 |
| V1/N1 | 36.26 | R2/R3 | 0.04 |
| V2/N2 | 36.26 | |R8/R7| | 0.12 |
| V3/N3 | 8.21 | f1/f2 | 0.36 |
| V4/N4 | 25.95 | |f3/f2| | 0.31 |
| V5/N5 | 36.26 | f/R5 | −0.92 |
| Vmin | 14.0 | (f/f4) − (f/f5) | 4.81 |

12th Embodiment

Figure 23:
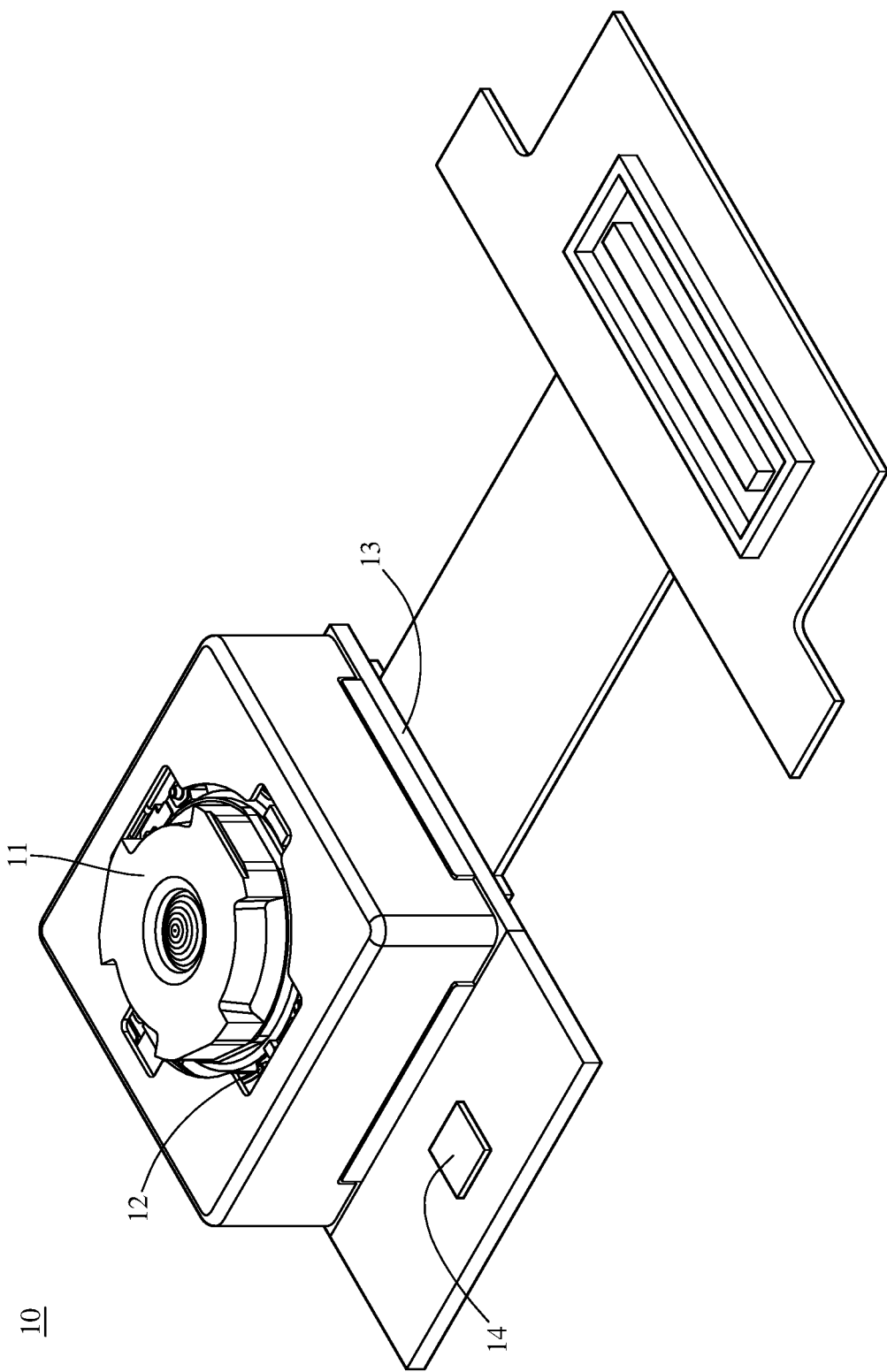
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the image lens assembly disclosed in the 7th embodiment, a barrel and a holder member (their reference numerals are omitted) for holding the image lens assembly. However, the lens unit 11 may alternatively be provided with the image lens assembly disclosed in other embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the image lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
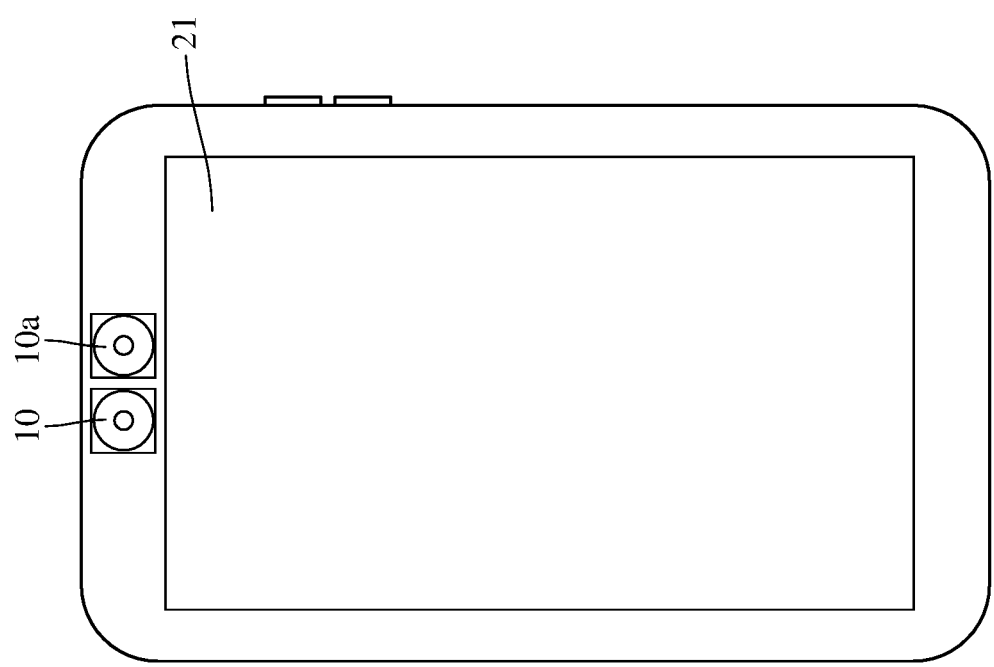
FIG. 24 is a perspective view of an electronic device according to the 13th embodiment of the present disclosure.

FIG. 24 is a perspective view of an electronic device according to the 13th embodiment of the present disclosure.

In this embodiment, an electronic device 20 is a smartphone including the image capturing unit 10 disclosed in the 12th embodiment, an image capturing unit 10a and a display unit 21. In FIG. 24, the image capturing units 10, 10a and the display unit 21 are disposed on the same side of the electronic device 20, such that the image capturing units 10 and 10a can be front-facing cameras of the electronic device 20 for taking selfies, but the present disclosure is not limited thereto.

The image capturing unit 10 is a wide-angle image capturing unit, and the image capturing unit 10a is a ToF (time of flight) image capturing unit, wherein the image capturing unit 10a can determine depth information of the imaged object. In this embodiment, the electronic device 20 includes multiple image capturing units 10 and 10a, but the present disclosure is not limited to the number and arrangement of image capturing units.

14th Embodiment

Figure 25:
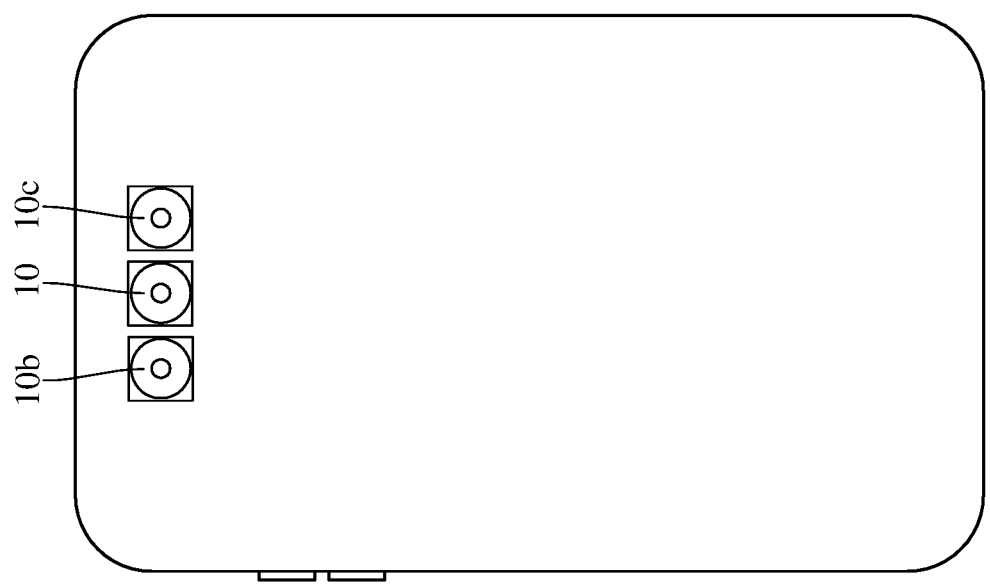
FIG. 25 is a perspective view of an electronic device according to the 14th embodiment of the present disclosure.

FIG. 25 is a perspective view of an electronic device according to the 14th embodiment of the present disclosure.

In this embodiment, an electronic device 30 is a smartphone including the image capturing unit 10 disclosed in the 12th embodiment, an image capturing unit 10b, an image capturing unit 10c and a display unit (not shown in the figure). In FIG. 25, the image capturing units 10, 10b and 10c are disposed on the same side of the electronic device 30, and the display unit is disposed on another side of the electronic device 30.

The image capturing unit 10 is a wide-angle image capturing unit, the image capturing unit 10b is an ultra-wide-angle image capturing unit, and the image capturing unit 10c is a telephoto image capturing unit. In this embodiment, the image capturing units 10, 10b and 10c have different fields of view, such that the electronic device 30 has various magnification ratios so as to meet the requirement of optical zoom functionality. The electronic device 30 includes multiple image capturing units 10, 10b and 10c, but the present disclosure is not limited to the number and arrangement of image capturing units.

15th Embodiment

Figure 26:
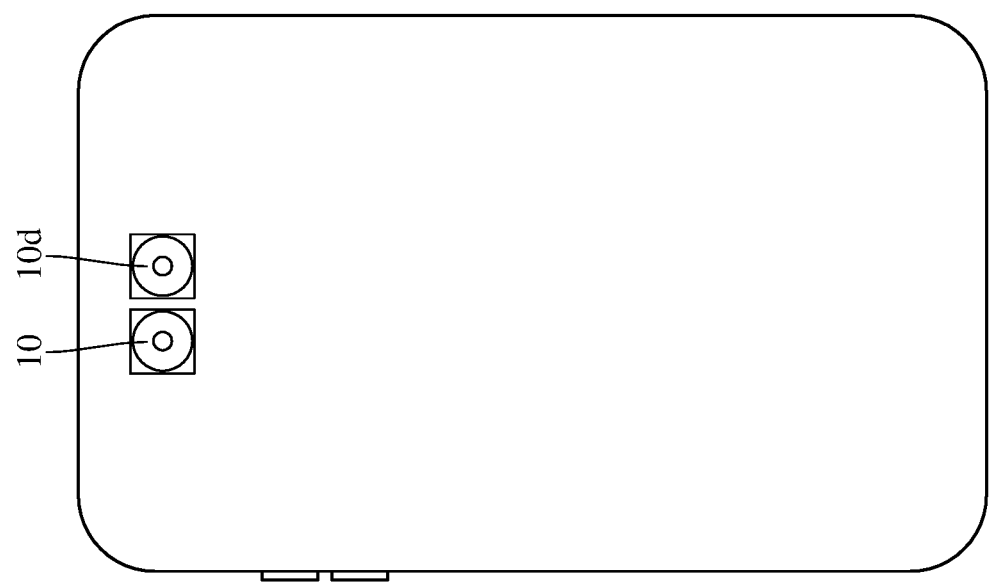
FIG. 26 is a perspective view of an electronic device according to the 15th embodiment of the present disclosure.

FIG. 26 is a perspective view of an electronic device according to the 15th embodiment of the present disclosure.

In this embodiment, an electronic device 40 is a smartphone including the image capturing unit 10 disclosed in the 12th embodiment, an image capturing unit 10d and a display unit (not shown in the figure). In FIG. 26, the image capturing units 10 and 10d are disposed on the same side of the electronic device 40, and the display unit is disposed on another side of the electronic device 40.

The image capturing unit 10 is a wide-angle image capturing unit, and the image capturing unit 10d is an ultra-wide-angle image capturing unit. In this embodiment, the image capturing units 10 and 10d have different fields of view, such that the electronic device 40 has various magnification ratios so as to meet the requirement of optical zoom functionality. The electronic device 40 includes multiple image capturing units 10 and 10d, but the present disclosure is not limited to the number and arrangement of image capturing units.

16th Embodiment

Figure 27:
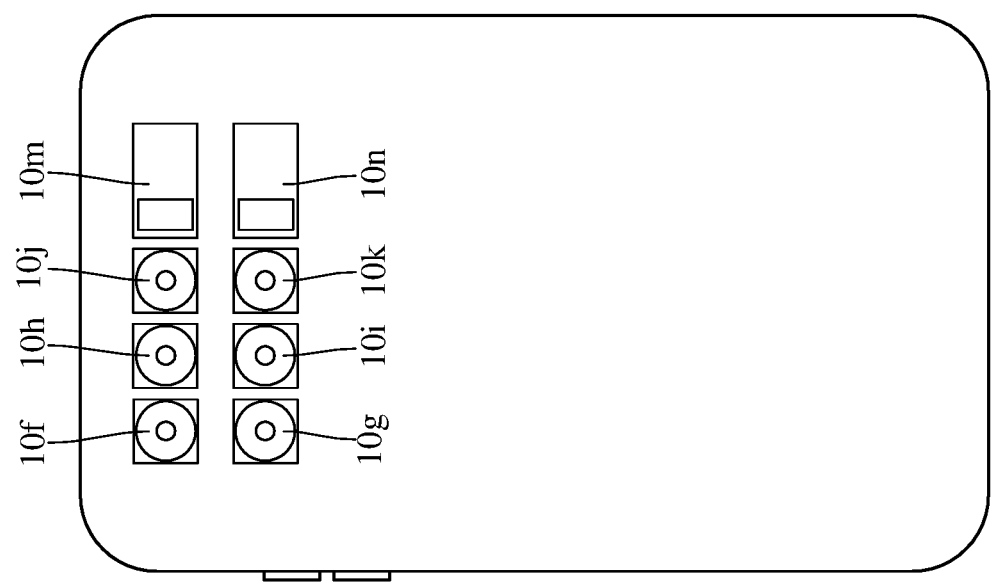
FIG. 27 is a perspective view of an electronic device according to the 16th embodiment of the present disclosure.

FIG. 27 is a perspective view of an electronic device according to the 16th embodiment of the present disclosure.

In this embodiment, an electronic device 50 is a smartphone including an image capturing unit 10f, an image capturing unit 10g, an image capturing unit 10h, an image capturing unit 10i, an image capturing unit 10j, an image capturing unit 10k, an image capturing unit 10m, an image capturing unit 10n and a display unit (not shown in the figure). The image capturing units 10f, 10g, 10h, 10i, 10j, 10k, 10m, 10n are disposed on the same side of the electronic device 50, and the display unit is disposed on another side of the electronic device 50. In addition, the image capturing unit 10h or 10i includes, for example, the image lens assembly disclosed in the 7th embodiment.

The image capturing units 10f and 10g are ultra-wide-angle image capturing units, the image capturing units 10h, 10i are wide-angle image capturing units, the image capturing units 10j, 10k are telephoto image capturing units, and the image capturing units 10m, 10n are telephoto image capturing units configured with light-folding element(s). The image capturing units 10m, 10n with light-folding element(s) may respectively have a configuration, for example, similar to that as shown in FIG. 28, FIG. 29 or FIG. 30, and a description in this regard will not be provided again. In this embodiment, the image capturing units 10f, 10g, 10h, 10i, 10j, 10k, 10m, 10n have different fields of view, such that the electronic device 50 has various magnification ratios so as to meet the requirement of optical zoom functionality. The electronic device 50 includes multiple image capturing units 10f, 10g, 10h, 10i, 10j, 10k, 10m, 10n, but the present disclosure is not limited to the number and arrangement of image capturing units.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the image lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising five lens elements, the five lens elements being, in order from an object side to an image side along an optical path, a first lens element, a second lens element, a third lens element, a fourth lens element and a fifth lens element;
    wherein a total number of lens elements in the image lens assembly is five, the first lens element has positive refractive power, the second lens element with positive refractive power has an image-side surface being convex in a paraxial region thereof, the fourth lens element with positive refractive power has an object-side surface being convex in a paraxial region thereof and having at least one concave critical point in an off-axis region thereof, and the fifth lens element has an image-side surface being concave in a paraxial region thereof and having at least one convex critical point in an off-axis region thereof;
    wherein an Abbe number of the third lens element is V3, an Abbe number of the fourth lens element is V4, a curvature radius of an object-side surface of the second lens element is R3, a curvature radius of the image-side surface of the second lens element is R4, a curvature radius of an object-side surface of the fifth lens element is R9, a curvature radius of the image-side surface of the fifth lens element is R10, half of a maximum field of view of the image lens assembly is HFOV, and the following conditions are satisfied:

$V3+V4<70$;

$0.50<(R3+R4)/(R3-R4)$;

$0<(R9+R10)/(R9-R10)$; and $0.90<\tan(HFOV)$.

2. The image lens assembly of claim 1, wherein a maximum image height of the image lens assembly is ImgH, an axial distance between the image-side surface of the fifth lens element and an image surface is BL, and the following condition is satisfied:

$2.5<IMGH/BL$.

3. The image lens assembly of claim 1, wherein the curvature radius of the object-side surface of the second lens element is R3, the curvature radius of the image-side surface of the second lens element is R4, and the following condition is satisfied:

$0.60<(R3+R4)/(R3-R4)<2.0$.

4. The image lens assembly of claim 1, wherein a curvature radius of an image-side surface of the first lens element is R2, the curvature radius of the object-side surface of the second lens element is R3, and the following condition is satisfied:

$-1.0<R2/R3$.

5. The image lens assembly of claim 1, wherein a focal length of the second lens element is f2, a focal length of the third lens element is f3, and the following condition is satisfied:

$|f3/f2|<1.0$.

6. The image lens assembly of claim 1, wherein the Abbe number of the third lens element is V3, the Abbe number of the fourth lens element is V4, and the following condition is satisfied:

$20<V3+V4<60$.

7. The image lens assembly of claim 1, wherein a focal length of the image lens assembly is f, a curvature radius of an object-side surface of the third lens element is R5, and the following condition is satisfied:

$f/R5<-0.60$.

8. The image lens assembly of claim 1, wherein an axial distance between an object-side surface of the first lens element and the image-side surface of the fifth lens element is Td, an entrance pupil diameter of the image lens assembly is EPD, and the following condition is satisfied:

$50<Td/EPD<2.75$.

9. The image lens assembly of claim 1, wherein the fourth lens element has an image-side surface being concave in a paraxial region thereof and having at least one convex critical point in an off-axis region thereof.

10. The image lens assembly of claim 1, wherein a focal length of the first lens element is f1, a focal length of the second lens element is f2, and the following condition is satisfied:

$0.30<f1/f2<2.0$.

11. The image lens assembly of claim 1, wherein half of the maximum field of view of the image lens assembly is HFOV, and the following condition is satisfied:

$0.95<\tan(HFOV)<2.0$;

wherein an Abbe number of the first lens element is V1, an Abbe number of the second lens element is V2, the Abbe number of the third lens element is V3, the Abbe number of the fourth lens element is V4, an Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the i-th lens element is Ni, and at least one lens element of the image lens assembly satisfies the following condition:

$7.5<Vi/Ni<12.0$, wherein $i=1,2,3,4$ or $5$.

12. The image lens assembly of claim 1, wherein a curvature radius of an object-side surface of the first lens element is R1, the curvature radius of the image-side surface of the second lens element is R4, and the following condition is satisfied:

$-0.50<(R1+R4)/(R1-R4)<0.50$.

13. The image lens assembly of claim 1, wherein a focal length of the image lens assembly is f, a focal length of the fourth lens element is f4, a focal length of the fifth lens element is f5, and the following condition is satisfied:

$1.0<(f/f4)-(f/f5)$.

14. The image lens assembly of claim 1, wherein a minimum value among Abbe numbers of all lens elements of the image lens assembly is Vmin, and the following condition is satisfied:

$V\min<20$.

15. The image lens assembly of claim 1, wherein a curvature radius of the object-side surface of the fourth lens element is R7, a curvature radius of an image-side surface of the fourth lens element is R8, and the following condition is satisfied:

$0.50<|R8/R7|$.

16. The image lens assembly of claim 1, wherein a curvature radius of the object-side surface of the fourth lens element is R7, a curvature radius of an image-side surface of the fourth lens element is R8, and the following condition is satisfied:

$(R7+R8)/(R7-R8)<1.5$.

17. An image capturing unit, comprising:
the image lens assembly of claim 1; and
an image sensor disposed on an image surface of the image lens assembly.

18. An electronic device, comprising:
the image capturing unit of claim 17.

19. An image lens assembly comprising five lens elements, the five lens elements being, in order from an object side to an image side along an optical path, a first lens element, a second lens element, a third lens element, a fourth lens element and a fifth lens element;
wherein a total number of lens elements in the image lens assembly is five, the first lens element has positive refractive power, the second lens element has positive refractive power, the fourth lens element with positive refractive power has an object-side surface being convex in a paraxial region thereof and having at least one concave critical point in an off-axis region thereof, the fifth lens element with negative refractive power has an object-side surface being convex in a paraxial region thereof and an image-side surface being concave in a paraxial region thereof, and the image-side surface of the fifth lens element has at least one convex critical point in an off-axis region thereof;

wherein an Abbe number of the third lens element is V3, an Abbe number of the fourth lens element is V4, a curvature radius of the object-side surface of the fourth lens element is R7, a curvature radius of an image-side surface of the fourth lens element is R8, half of a maximum field of view of the image lens assembly is HFOV, and the following conditions are satisfied:

$V3+V4<70$;

$1.0<|R8/R7|$; and $0.90<\tan(HFOV)$.

20. The image lens assembly of claim 19, wherein the Abbe number of the third lens element is V3, the Abbe number of the fourth lens element is V4, and the following condition is satisfied:

$20<V3+V4<60$.

21. The image lens assembly of claim 19, wherein the third lens element has negative refractive power, a focal length of the image lens assembly is f, a curvature radius of an object-side surface of the third lens element is R5, and the following condition is satisfied:

$f/R5<-0.60$.

22. The image lens assembly of claim 19, wherein a minimum value among Abbe numbers of all lens elements of the image lens assembly is Vmin, and the following condition is satisfied:

$Vmin<20$.

23. The image lens assembly of claim 19, wherein a focal length of the image lens assembly is f, a focal length of the fourth lens element is f4, a focal length of the fifth lens element is f5, and the following condition is satisfied:

$1.0<(f/f4)-(f/f5)$.

24. The image lens assembly of claim 19, wherein a focal length of the second lens element is f2, a focal length of the third lens element is f3, and the following condition is satisfied:

$|f3/f2|<1.0$.

25. The image lens assembly of claim 19, wherein half of the maximum field of view of the image lens assembly is HFOV, and the following condition is satisfied:

$0.95<\tan(HFOV)<2.0$.

26. The image lens assembly of claim 19, wherein a maximum image height of the image lens assembly is ImgH, an axial distance between the image-side surface of the fifth lens element and an image surface is BL, and the following condition is satisfied:

$2.5<ImgH/BL$.

* * * * *